United States Patent
El Defrawy et al.

(10) Patent No.: US 10,621,364 B1
(45) Date of Patent: Apr. 14, 2020

(54) GENERIC PATTERN MATCHING SYSTEM

(71) Applicant: HRL Laboratories, LLC, Malibu, CA (US)

(72) Inventors: Karim El Defrawy, Santa Monica, CA (US); Joshua W. Baron, Los Angeles, CA (US); Jonathan Katz, College Park, MD (US)

(73) Assignee: HRL Laboratories, LLC, Malibu, CA (US)

( * ) Notice: Subject to any disclaimer, the term of this patent is extended or adjusted under 35 U.S.C. 154(b) by 938 days.

(21) Appl. No.: 15/215,454

(22) Filed: Jul. 20, 2016

Related U.S. Application Data

(63) Continuation-in-part of application No. 14/205,295, filed on Mar. 11, 2014, now Pat. No. 9,613,292, which is a continuation-in-part of application No. 13/749,683, filed on Jan. 25, 2013, now Pat. No. 9,009,089.

(60) Provisional application No. 61/591,207, filed on Jan. 26, 2012, provisional application No. 61/778,924, filed on Mar. 13, 2013, provisional application No. 62/195,239, filed on Jul. 21, 2015.

(51) Int. Cl.
  *G06F 21/60* (2013.01)
  *H04L 9/00* (2006.01)
  *H04L 9/06* (2006.01)

(52) U.S. Cl.
  CPC ............ *G06F 21/602* (2013.01); *H04L 9/008* (2013.01); *H04L 9/0631* (2013.01)

(58) Field of Classification Search
  CPC .............. G06F 21/602; G06F 21/6254; G06F 17/30516; G06F 17/30864; G06F 17/30247; G06F 17/30985; H04L 63/0428; H04L 67/10; H04L 9/008; H04L 9/0631; G06K 9/6201
  USPC .......................................................... 706/18
  See application file for complete search history.

(56) References Cited

U.S. PATENT DOCUMENTS

| | | | |
|---|---|---|---|
| 6,219,794 B1 * | 4/2001 | Soutar | H04L 9/0866 713/186 |
| 7,085,418 B2 | 8/2006 | Kaneko et al. | |
| 7,599,894 B2 | 10/2009 | Owechko et al. | |
| 7,787,474 B2 | 8/2010 | Van Lunteren | |

(Continued)

OTHER PUBLICATIONS

Erik Hjelmvik & Wolfgang John, "Statistical Protocol IDentification with SPID: Preliminary Results". SNCNW'09: 6th Swedish National Computer Networking Workshop, Uppsala, Sweden, pp. 1-5, May 4, 2009 <http://spid.sourceforge.net/sncnw09-hjelmvik_john-CR.pdf>.

(Continued)

*Primary Examiner* — Dave Misir
(74) *Attorney, Agent, or Firm* — Tope-McKay & Associates

(57) ABSTRACT

Described is a secure system for generic pattern matching. In operation, the system determines if a pattern p, as presented by a second party, is within a textual pattern T, as maintained by a first party. In making such a determination, the system uses a series of binary value matrices and corresponding pairs of encrypted permuted matrices. Challenge bits are then used to generate permutations and later verify correctness of the various encrypted permuted matrices. If it is determined that pattern p is within text T, the, for example, an access protocol is initiated.

20 Claims, 3 Drawing Sheets

(56) References Cited

U.S. PATENT DOCUMENTS

| | | | |
|---|---|---|---|
| 8,068,431 B2 | 11/2011 | Varadarajan et al. | |
| 9,311,595 B1 | 4/2016 | Hoffmann | |
| 2003/0046586 A1* | 3/2003 | Bheemarasetti | .... H04L 63/0272 726/15 |
| 2004/0088722 A1* | 5/2004 | Peker | .......... G06F 16/739 725/19 |
| 2007/0140479 A1* | 6/2007 | Wang | ............ H04L 9/008 380/30 |
| 2008/0005091 A1* | 1/2008 | Lawler | .......... G06F 16/951 |
| 2008/0294909 A1* | 11/2008 | Ostrovsky | ......... G06F 16/24568 713/189 |
| 2009/0119518 A1* | 5/2009 | Staddon | .......... G06F 21/6227 713/193 |
| 2010/0076919 A1* | 3/2010 | Chen | ............ H04L 12/56 706/48 |
| 2014/0121990 A1* | 5/2014 | Baldi | ............ G16B 30/00 702/20 |

OTHER PUBLICATIONS

Martin Roesch: Snort: Lightweight Intrusion Detection for Networks. LISA 1999 <http://dblp.dagstuhl.de/db/conf/lisa/lisa1999.html#Roesch99> : Nov. 7-12, 1999, pp. 229-238.

"Technical Details of I7-filter," Last updated Dec. 9, 2006, pp. 1-2, website http://I7-filter.sourceforge.net/technicaldetails.

Khalife, J., Hajjar, A., & Diaz-Verdejo, J. (Nov. 2011). On the Performance of OpenDPI in Identifying P2P Truncated Flows. In AP2PS 2011, The Third International Conference on Advances in P2P Systems, pp. 79-84.

N. Cascarano, A. Este, F. Gringoli, F. Risso, and L. Salgarelli, "An Experimental Evaluation of the Computational Cost of a DPI Traffic Classifier", Proc. GLOBECOM'09, 2009, pp. 1-8.

Sipser, Introduction to the Theory of Computation. PWS, Boston. ISBN 0-534-94728-X. Section 1.1: Finite Automata, pp. 31-47, 1997.

A V Aho, M J Corasick, Efficient string matching: An aid to bibliographic search. Communications of the ACM, 18(6): pp. 333-340, 1975.

EBayes TCP, Adaptive, Model-based Monitoring for Cyber Attack Detection. Keith Skinner & Alfonso Valdes. Lecture Votes in Computer Science, No. 1907. From Recent Advances in Intrusion Detection (RAID 2000). Edited by H. Debar and L. Me and F. Wu. Springer-Verlag, Toulouse, France. Oct. 2000. pp. 80-92.

K. Koscher, A. Czeskis, F. Roesner, S. Patel, T. Kohno, S. Checkoway, D. McCoy, B. Kantor, D. Anderson, H. Shacham, S. Savage. Experimental Security Analysis of a Modern Automobile. The IEEE Symposium on Security and Privacy, Oakland, CA, May 16-19, 2010, pp. 447-462.

Michael Sipser, Introduction to the Theory of Computation. PWS, Boston. 1997. ISBN 0-534-94728-X. Section 1.1: Finite Automata, pp. 31-47.

W. Maier, et al., "A Minimal Model for the Study of Polychronous Groups," arXiv:0806.1070v1, Condensed Matter. Disordered Systems and Neural Networks, 2008, pp. 1-8.

L. Di Stefano, S. Mattoccia, "A sufficient condition based on the Cauchy-Schwarz inequality for efficient Template Matching", IEEE Int. Conf. on Image Processing (ICIP 2003), Sep. 14-17, 2003, Barcelona, Spain, pp. I-269-I-272.

L. G. Brown, "A survey of image registration techniques," ACM Comput. Surv., vol. 24, No. 4, pp. 325-376, 1992.

J. J. Hopfield, Neural networks and physical systems with emergent collective computational abilities, Proceedings of the National Academy of Sciences of the USA, vol. 79, No. 8, pp. 2554-2558, Apr. 1982.

P Wang, A DeNunzio, P Okunieff, WG O'Dell. Lung metastases detection in CT images using 3D template matching. Med. Phys. 34 (3), pp. 915-922, Mar. 2007.

Luigi di Stefano, Stefano Mattoccia, Federico Tombari, "An Algorithm for Efficient and Exhaustive Template Matching." Jan. 2004;

In proceeding of Image Analysis and Recognition: International Conference, ICIAR 2004, Porto, Portugal, Sep. 29-Oct. 1, 2004, Proceedings, Part II. pages 408-415.

R.S. Boyer, at al., "A fast string searching algorithm," Communications of the ACM, 20; pp. 762-772, 1977.

M. Zubair, et al. "Text scanning approach for exact string matching," International Conference on Networking and Information Technology, 2010, pp. 118-122.

M. Sipser, "Introduction to the Theory of Computation," PWS, Boston, ISBN 0-534-94728-X, Section 1.1; Finite Automata, pp. 31-47, 1997.

W. Maass, et al., "Real-time computing without stable states; a new framework for neural computation based on perturbations," Neural Computation 14(11); pp. 2531-2560, 2002.

A.V. Aho, et al., "Efficient string matching: An aid to bibliographic search," Communications of the ACM, 18(6): pp. 333-340, 1975.

A. Waibel, et al., "Phoneme Recognition Using Time-Delay Neural Networks," IEEE Transactions on Acoustics, Speech, and Signal Porcessing, 37(3): pp. 328-339, 1989.

J.L. Elman, "Finding structure in time," Cognitive Science, 14(2): pp. 179-211, 1990.

E.M. Izhikevich, "Polychroniation: Computation with spikes," Neural Computation, 18(2): pp. 245-282, 2006.

H. Pugam-Moisy, et al., "Delay learning and polychronization for reservoir computing," Neurocomputing, 71 (7-9): pp. 1143-1158, 2008.

Notice of Allowance for U.S. Appl. No. 13/749,683, dated Dec. 10, 2014.

Alfred V. Aho and Margaret J. Corasick. Efficient string matching: an aid to bibliographic search. Commun. ACM, 18: pp. 333-340, Jun. 1975.

Marina Blanton and Mehrdad Aliasgari. Secure outsourcing of dna searching via finite automata. In 24th annual IFIP WG 11.3 working conference on Data and applications security and privacy (DBSec'10), pp. 49-64, 2010.

Taher El Gamal. A public key cryptosystem and a signature scheme based on discrete logarithms. In Proceedings of CRYPTO 84 on Advances in cryptology, pp. 10-18, New York, NY, USA, 1985. Springer-Verlag New York, Inc.

Ronald Cramer, Rosario Gennaro, and Berry Schoenmakers. A secure and optimally efficient multi-authority election scheme. pp. 103-118. Springer-Verlag, 1997.

Ivan Damgård. Efficient concurrent zero-knowledge in the auxiliary string model. In Proceedings of the 19th International conference on Theory and application of cryptographic techniques, EUROCRYPT'00, pp. 418-430, Berlin, Heidelberg, 2000. Springer-Verlag.

Ivan Damgård and Mats Jurik. A generalisation, a simplification and some applications of paillier's probabilistic public-key system. In Proceedings of the 4th International Workshop on Practice and Theory in Public Key Cryptography: Public Key Cryptography, PKC '01, pp. 119-136, London, UK, 2001. Springer-Verlag.

Ivan Damgård and Claudio Orlandi. Multiparty computation for dishonest majority: from passive to active security at low cost. In Proceedings of the 30th annual conference on Advances in cryptology, CRYPTO'10, pp. 558-576, Berlin, Heidelberg, 2010. Springer-Verlag.

Jens Groth and Yuval Ishai. Sub-linear zero-knowledge argument for correctness of a shuffle. In Nigel Smart, editor, Advances in Cryptology—EUROCRYPT 2008, vol. 4965 of Lecture Notes in Computer Science, pp. 379-396. Springer Berlin / Heidelberg, 2008.

O. Goldreich, S. Micali, and A. Wigderson. How to play any mental game. In Proceedings of the nineteenth annual ACM symposium on Theory of computing, STOC '87, pp. 218-229, New York, NY, USA, 1987. ACM.

Juan A. Garay, Philip MacKenzie, and Ke Yang. Strengthening zero-knowledge protocols using signatures. In Proceedings of the 22nd international conference on Theory and applications of cryptographic techniques, EUROCRYPT'03, pp. 177-194, Berlin, Heidelberg, 2003. Springer-Verlag.

Carmit Hazay, Rosario Gennaro, and Jeffery Sorensen. Automata evaluation and text search protocols with simulation based security. In Public Key Cryptography, pp. 145-160, 2010.

(56) References Cited

OTHER PUBLICATIONS

Heiko Hoffmann, Michael Howard, and Michael Daily. Fast pattern matching with time-delayed neural networks. In Proceedings of International Joint Conference on Neural Networks, San Jose, California, USA, Jul. 31-Aug. 5, 2011, pp. 2424-2429.

Carmit Hazay and Yehuda Lindell. Efficient protocols for set intersection and pattern matching with security against malicious and covert adversaries. In Proceedings of the 5th conference on Theory of cryptography, TCC'08, pp. 155-175, Berlin, Heidelberg, 2008. Springer-Verlag.

Carmit Hazay and Tomas Toft. Computationally secure pattern matching in the presence of malicious adversaries. In ASIACRYPT, pp. 195-212, 2010.

Yuval Ishai, Manoj Prabhakaran, and Amit Sahai. Founding cryptography on oblivious transfer—efficiently. In Proceedings of the 28th Annual conference on Cryptology: Advances in Cryptology, CRYPTO 2008, pp. 572-591, Berlin, Heidelberg, 2008. Springer-Verlag.

Jonathan Katz and Lior Malka. Secure text processing with applications to private dna matching. In Proceedings of the 17th ACM conference on Computer and communications security, CCS '10, pp. 485-492, New York, NY, USA, 2010. ACM.

Knuth, Donald; Morris, James H., jr; Pratt, Vaughan (1977). "Fast pattern matching in strings". SIAM Journal on Computing 6(2): pp. 323-350.

Richard M. Karp and Michael O. Rabin. Efficient randomized pattern-matching algorithms. IBM J. Res. Dev., 31: pp. 249-260, Mar. 1987.

K. Namjoshi and G. Narlikar. Robust and fast pattern matching for intrusion detection. In INFOCOM, 2010 Proceedings IEEE, pp. 1-9, Mar. 2010.

Pascal Paillier. Public-key cryptosystems based on composite degree residuosity classes. In Proceedings of the 17th international conference on Theory and application of cryptographic techniques, EUROCRYPT'99, pp. 223-238, 1999.

Torben P. Pedersen. Non-interactive and information-theoretic secure verifiable secret sharing. In Proceedings of the 11th Annual International Cryptology Conference on Advances in Cryptology, CRYPTO '91, pp. 129-140, London, UK, 1992. Springer-Verlag.

Al-Khalifa, et al., "Structural joins: A primitive for efficient XML query pattern matching," In Proceedings of the 18th International Conference on Data Engineering, ICDE '02, pp. 141-153, Washington, DC, USA, 2002. IEEE Computer Society.

Claus-Peter Schnorr. Efficient identification and signatures for smart cards. In Proceedings of the 9th Annual International Cryptology Conference on Advances in Cryptology, CRYPTO '89, pp. 239-252, London, UK, 1990, Springer-Verlag.

Juan Ramón Troncoso-Pastoriza, Stefan Katzenbeisser, and Mehmet Celik. Privacy preserving error resilient dna searching through oblivious automata. In Proceedings of the 14th ACM conference on Computer and communications security, CCS'07, pp. 519-528, New York, NY, USA, 2007. ACM.

Tsung-Hsi Tsai. Average case analysis of the boyer-moore algorithm. Random Struct. Algorithms, 28: pp. 481-498, Jul. 2006.

Andrew C. Yao. Protocols for secure computations. In Proceedings of the 23rd Annual Symposium on Foundations of Computer Science, SFCS '82, pp. 160-164, Washington, DC, USA, 1982. IEEE Computer Society.

Andrew Chi-Chih Yao. How to generate and exchange secrets. In Proceedings of the 27th Annual Symposium on Foundations of Computer Science, pp. 162-167, Washington, DC, USA, 1986. IEEE Computer Society.

Joshua Baron, Karim El Defrawy, Kirill Minkovich, Rafail Ostrovsky, and Eric Tressler. 5PM: Secure Pattern Matching. Security and Cryptography for Networks. Lecture Notes in Computer Science, vol. 7485, pp. 222-240, 2012.

Jonathan Katz and Lior Malka. (2010). Secure text processing with applications to private DNA matching. In Proceedings of the 17th ACM conference on Computer and communications security (CCS '10). ACM, New York, NY, USA, 485-492. DOI=10.1145/1866307.1866361.

Carmit Hazay, Rosario Gennaro, Jeffrey Sorensen, "Automata Evaluation and Text Search Protocols with Simulation Based Security," Cryptology ePrint Archive Report, 2010/484 (2010).

Mikhail J. Atallah, Florian Kerschbaum, and Wenliang Du. (2003). Secure and private sequence comparisons. In Proceedings of the 2003 ACM workshop on Privacy in the electronic society (WPES '03). ACM, New York, NY, USA, 39-44.

Mikhail J. Atallah and Jiangtao Li. 2005. Secure outsourcing of sequence comparisons. Int. J. Inf. Secur. 4, 4 (Oct. 2005), 277-287.

Juan Ramon Troncoso-Pastoriza, Stefan Katzenbeisser, and Mehmet Celik. (2007). Privacy preserving error resilient dna searching through oblivious automata. In Proceedings of the 14th ACM conference on Computer and communications security (CCS '07). ACM, New York, NY, USA, 519-528. DOI=10.1145/1315245.1315309.

Marina Blanton and Mehrdad Aliasgari. (2010). Secure outsourcing of DNA searching via finite automata. In Proceedings of the 24th annual IFIP WG 11.3 working conference on Data and applications security and privacy (DBSec'10), Sara Foresti and Sushil Jajodia (Eds.). Springer-Verlag, Berlin, Heidelberg, 49-64.

Robert S. Boyer and J. Strother Moore. 1977. A fast string searching algorithm. Commun. ACM20, 10 (Oct. 1977), 762-772.

Alfred V. Aho and Margaret J. Corasick. 1975. Efficient string matching: an aid to bibliographic search. Commun. ACM 18, 6 (Jun. 1975), 333-340.

Knuth, D. E., Morris, J. H., & Pratt, V. R. (1977). Fast pattern matching in strings. SIAM Journal on Computing, 6(2), 323-350.

Hazay, C. and Toft, T. 2010. Computationally Secure Pattern Matching in the Presence of Malicious Adversaries. ASIACRYPT 2010.

Office Action 1 for U.S. Appl. No. 14/205,295, dated Jun. 3, 2016.

Landau, G., et al., "Pattern Matching in a Digitized Image," Algorithmica, 1994, 12, pp. 375-408.

Wei, L., et al., "Third-Party DFA Evaluation on Encrypted Files," Tech. Rep. TR11-005, Depart of Computer Science, University of North Carolina at Chapel Hill, 2011.

Response to Office Action 1 for U.S. Appl. No. 14/205,295, dated Nov. 3, 2016.

Notice of Allowance for U.S. Appl. No. 14/205,295, dated Nov. 28, 2016.

Alfred V. Aho and Margaret J. Corasick. Efficient string matching: an aid to bibliographic search. Commun. ACM, 18: pp. 333-340, Jun. 1975.

Yonatan Aumann and Yehuda Lindell. Security against covert adversaries: Efficient protocols for realistic adversaries. J. Cryptol., 23: pp. 281-343, Apr. 2010.

Joshua Baron, Karim El Defrawy, Kirill Minkovich, Rafail Ostrovsky, and Eric Tressler. 5pm: Secure pattern matching. Cryptology ePrint Archive, Report 2012/698, 2012, pp. 1-51, http://eprint.iacr.org/.

Joshua Baron, Karim El Defrawy, Kirill Minkovich, Rafail Ostrovsky. And Eric Tressler. 5pm: Secure pattern matching. In Ivan Visconti and Roberto Prisco, editors, Security and Cryptography for Networks, vol. 7485 of Lecture Notes in Computer Science, pp. 222-240. Springer Berlin Heidelberg, 2012.

Joshua Baron, Karim El Defrawy, Kirill Minkovich, Rafail Ostrovsky, and Eric Tressler. 5pm: Secure pattern matching. Journal of Computer Security 21 (2013), pp. 601-625.

Jonathan Katz and Lor Malka. Secure text processing with applications to private DNA matching. In Proceedings of the 17th ACM Conference on Computer and Communications Security, CCS '10, pp. 485-492, New York, NY, USA, 2010. ACM.

Donald E. Knuth, James H. Morris, , and Vaughan R. Pratt. Fast pattern matching in strings, SIAM Journal on Computing, 1977, vol. 6, No. 2, pp. 323-350.

Richard M. Karp and Michael O. Rabin. E_cient randomized pattern-matching algorithms. IBM J. Res. Dev., 31: pp. 249-260, Mar. 1987.

Yehuda Lindell. Fast cut-and-choose based protocols for malicious and covert adversaries. In Ran Canetti and JuanA. Garay, editors,

(56) References Cited

OTHER PUBLICATIONS

Advances in Cryptology CRYPTO 2013; vol. 8043 of Lecture Notes in Computer Science, pp. 1-17. Springer Berlin Heidelberg, 2013.
Structural joins: A primitive for e_cient XML query pattern matching. In Proceedings of the 18th International Conference on Data Engineering, ICDE '02, pp. 141-153, Washington, DC, USA, 2002. IEEE Computer Society.
Security and privacy assurance research (spar) program broad agency announcement. In https://www.iarpa.gov/index.php/research-programs/spar , downloaded on Aug. 8, 2016.
Juan Ramón Troncoso-Pastonza, Stefan Katzenbeisser, and Mehmet Celik. Privacy preserving error resilient DNA searching through oblivious automata. In Proceedings of the 14th ACM Conference on Computer and Communications Security, CCS'07, pp. 519-528, New York, NY, USA, 2007, ACM.
Damien Vergnaud. E_cient and secure generalized pattern matching via fast Fourier transform, In Abderrahmane Nitaj and David Pointcheval, editors, AFRICACRYPT '11, vol. 6737 of LNCS, pp. 41-58. Springer Berlin / Heidelberg, 2011.

* cited by examiner

GENERIC PATTERN MATCHING SYSTEM

CROSS-REFERENCE TO RELATED APPLICATIONS

This is a Continuation-in-Part application of U.S. application Ser. No. 14/205,295, filed on Mar. 11, 2014, which is a Continuation-in-Part application of U.S. application Ser. No. 13/749,683, filed on Jan. 25, 2013, now patented as U.S. Pat. No. 9,009,089, which claims priority from U.S. Provisional Application No. 61/591,207, filed on Jan. 26, 2012, no expired.

This is ALSO a non-provisional patent application claiming priority of U.S. Provisional Application No. 62/195239, filed on Jul. 21, 2015, the entirety of which is hereby incorporated by reference.

BACKGROUND OF INVENTION (1) Field of Invention

The present invention relates to a system tbr pattern matching and, more particularly, to a secure system for generic pattern matching.

(2) Description of Related Art

In computer science, pattern matching is the act of checking some sequence of characters from a fixed alphabet for the presence of the constituents of some pattern. The patterns generally have the form of a sequence of characters. Pattern matching has many applications in computer science including, but not limited to, text-processing, database operations, network filtering, and security applications. It is a problem that has been extensively researched, resulting in several efficient (although insecure) techniques to solve various variations thereof (see, for example, the List of Incorporated Literature References, Literature Reference Nos. 1, 11, and 18).

The prior state of the art includes the secure pattern matching protocols of Literature Reference Nos. 3-5, 9, and 19, none of which support the covert adversary model. Another Line of related work includes the more general secure computation protocols of Literature Reference No. 13, which are secure in the covert model but must rely on a Boolean circuit designed to perform pattern matching. The generic protocols of Literature Reference No. 13 have communication complexity proportional to the product of the text length and the pattern length, which is asymptotically larger than desired.

Although researched extensively, even in the insecure setting, there is not a single algorithm that performs well in all cases, is efficient in both its speed and memory usage, can handle wildcards, approximate matches and limited range queries (a single character wildcard allows a single digit range to be specified). Thus, a continuing need exists for a secure pattern matching method that is efficient in both its speed and memory usage, can handle wildcards, and approximate matches.

SUMMARY OF INVENTION

This disclosure provides a generic pattern matching system for pattern matching between a first system P1 and a second system P2. The system includes one or more processors and associated memory having executable instructions encoded thereon, such that upon execution of the instructions, the one or more processors perform several operations, including:

generating, by P2 and based on pattern p, a first binary value matrix $M_{CSV}$ and a corresponding first pair of encrypted permuted matrices;

generating, by P1, a first random challenge bit and, based on text T, generating a second binary value matrix ($M_T$) and a corresponding second pair of encrypted permuted matrices;

applying, by P2 and based on the first random challenge bit, a permutation to one of the first pair of encrypted permuted matrices and transmitting encrypted results to P1, and generating a second random challenge bit;

verifying, by P1, that the encrypted results correspond to the first pair of encrypted permuted matrices, such that if not, P1 aborts and declares P2 as a cheater, otherwise P1 continues and generates an encryption of one of the encrypted permuted matrices corresponding to $M_T$ as generated by P1.

verifying, by P2, that the encrypted permuted matrix corresponding to $M_T$ is correct such that if not, P2 aborts and declares P1 as a cheater, otherwise P2 continues by generating third and fourth random challenge bits;

formatting, by P1 and based on the third and fourth random challenge bits, randomized decryptions for results of multiplying an encrypted matrix corresponding to pattern p of and text T;

verifying, by P2, that the randomized decryptions are correctly formatted, such that if not, P2 aborts and declares P2 as a cheater, otherwise P2 continues;

determining, by P2, whether or not pattern p is within text T based on the randomized decryptions; and initiating an access protocol if pattern p is within text T.

In another aspect, in initiating the access protocol, the one or more processers unlock a node in a network to grant access to the node to P2.

In yet another aspect, the process of generating, by P2 and based on pattern p, a first binary value matrix $M_{CSV}$ and a corresponding first pair of encrypted permuted matrices, further comprises operations of:

constructing the first binary value matrix $M_{CSV}$ from pattern p;

selecting matrices $M_{CSV_0}$ and $M_{CSV_1}$ uniformly and independently at random from a set of $\mathbb{M}_{|\Sigma|+1,m}(\mathbb{Z}_2)$ restricted so that every column has exactly one 1 and remaining numbers in every column includes 0s;

selecting permuations $\pi_0, \pi_1$ from $S_{|\Sigma|+1}^m$, interpreted as an ordered m-tuple of permutations on columns, such that computing $\pi_i(M_{CSV_i})$ and removing the last row equals $M_{CSV}$ for $i \in \{0,1\}$; and computing the first pair of encrypted permuted matrices as $Enc_B(M_{CSV_0}, r_{CSV_0})$ and $Enc_B(M_{CSV_1}, r_{CSV_1})$ and transmitting the first pair of encrypted permuted matrices to P1.

Additionally, the process of generating, by P1, a first random challenge bit and, based on text T, generating a second binary value matrix ($M_T$) and a corresponding second pair of encrypted permuted matrices, further comprises operations of:

selecting the first random challenge bit $b_1$ uniformly and independently at random and sends $b_1$ to P2;

constructing the second binary value matrix ($M_T$) from T;

selecting matrices $M_{T_0}$ and $M_{T_1}$ uniformly and independently at random from a set of $\mathbb{M}_{n,|\Sigma|}(\mathbb{Z}_2)$ restricted so that every row has exactly one 1 and remaining numbers in every row includes 0s;

selecting permutations $\gamma_0, \gamma_1$ from $S_{|\Sigma|}^n$, interpreted as an ordered n-tuple of permutations on rows, such that $\gamma_i(M_{T_1}) = M_T$ for $i \in \{0,1\}$; and computing the second pair of encrypted permuted matrices $Enc_A(M_{T_0}, r_{T_0})$ and $Enc_A(M_{T_1}, r_{T_1})$ and transmitting the second pair of encrypted permuted matrices to P2.

In another aspect, the process of applying, by P2 and based on the first random challenge bit, a permutation to one of the first pair of encrypted permuted matrices and transmitting encrypted results to P1, and generating a second random challenge bit, further comprises operations of:

computing encryption $Enc_B(M_{CSV})$ by first computing $$\pi_{1-b_1}(Enc_B(M_{CSV_{1-b_1}}, r_{CSV_{1-b_1}}))$$

and then removing a last row;
transmitting $$M_{CSV_{b_1}}, r_{CSV_{b_1}},$$

and $\pi_{1-b_1}$ to P1; and
selecting the second random challenge bit $b_2$ uniformly at random and transmitting $b_2$ to P1.

Additionally, the process of verifying, by P1, that the encrypted results correspond to the first pair of encrypted permuted matrices and generating an encryption of one of the encrypted permuted matrices corresponding to $M_T$, further comprises operations of:

checking $$pk_B, M_{CSV_{b_1}}, \text{ and, } r_{CSV_{b_1}} \text{ that } Enc_B(M_{CSV_{b_1}}, r_{CSV_{b_1}})$$

was correctly computed, such that if not, P1 aborts and declares P2 as a cheater, otherwise continuing;
determining $Enc_B(M_{CSV})$ by first computing $$\pi_{1-b_1}(Enc_B(M_{CSV_{1-b_0}}, r_{CSV_{1-b_1}}))$$

and then removing a last row;
setting $$Enc_A(M_T) = \gamma_{1-b_2}(Enc_A(M_{T_{1-b_2}}, r_{T_{1-b_2}}));$$

transmitting $$M_{T_{b_2}}, r_{T_{b_2}}, \gamma_{1-b_2}$$

to P2;
selecting $M_0$ uniformly at random from $\mathbb{M}_{n,|\Sigma|}(\mathbb{Z}_2)$ and setting $M_1 = M_T - M_0$;
selecting $Z_0$ and $Z_1$ uniformly and independently at random from $Z_2^{n-m+1}$ and setting $Z = Z_0 + Z_1$;
for $i \in \{0,1\}$, computing $K_i = 5PM(M_i \cdot Enc_B(M_{CSV})) \otimes Enc_B(Z_i)^{-1}$;
computing $K' = 5PM(M_T \cdot Enc_B(M_{CSV})) \otimes Enc_B(Z_i)^{-1} = K_0 \otimes K_1$;
computing and transmitting $Enc_A(M_0, r_{M_0})$, $Enc_A(M_1, r_{M_1})$, $Enc_A(Z_0, r_{Z_0})$, and $Enc_A(Z_1, r_{Z_1})$ to P2, and transmitting $K_0$ and $K_1$ to P2;

selecting $u_0$, $u_1$, and $v_1$ uniformly and independently at random from $Z_2^{n-m+1}$;
computing $Z^*v_0$, $Z^*v_1$, $(K'(*)v_0) \otimes Enc_B(u_0))$ and $(K'(*)v_1) \otimes Enc_B(u_1))$; and
computing and transmitting $Enc_A(u_0, r_{u_0})$, $Enc_A(u_1, r_{u_1})$, $Enc_A(v_0, r_{v_0})$, $Enc_A(v_1, r_{v_1})$, $Enc_A(Z^*v_0, r_0)$ and $Enc_A(Z^*v_1, r_1)$ to P2 and transmitting $(K'(*)v_0) \otimes Enc_B(u_0))$ and $(K'(*)v_1) \otimes Enc_B(u_1))$ to P2.

Further, the process of verifying, by P2, that the encrypted permuted matrix corresponding to $M_T$ is correct and generating third and fourth random challenge bits, further comprises operations of:

using $$pk_A, M_{T_{b_2}}, \text{ and } r_{T_{b_2}},$$

checking that the encrypted permuted matrix corresponding to $M_T$, denoted as $$Enc_A(M_{T_{b_2}}, r_{T_{b_2}})$$

was correctly computed, such that if not, P2 aborts and declares P1 as a cheater, otherwise P2 continues;
computing $$Enc_A(M_T) = \gamma_{1-b_2}(Enc_A(M_{T_{1-b_2}}, r_{T_{1-b_2}}));$$

selecting the third random challenge bit $b_3$ uniformly and independently at random and sending $b_3$ to P1; and
selecting the fourth random challenge $b_4$ uniformly and independently at random and sending $b_4$ to P1.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the followinv, detailed descriptions of the various aspects of the invention in conjunction with reference to the following drawings, where.

DETAILED DESCRIPTION

Figure 1:
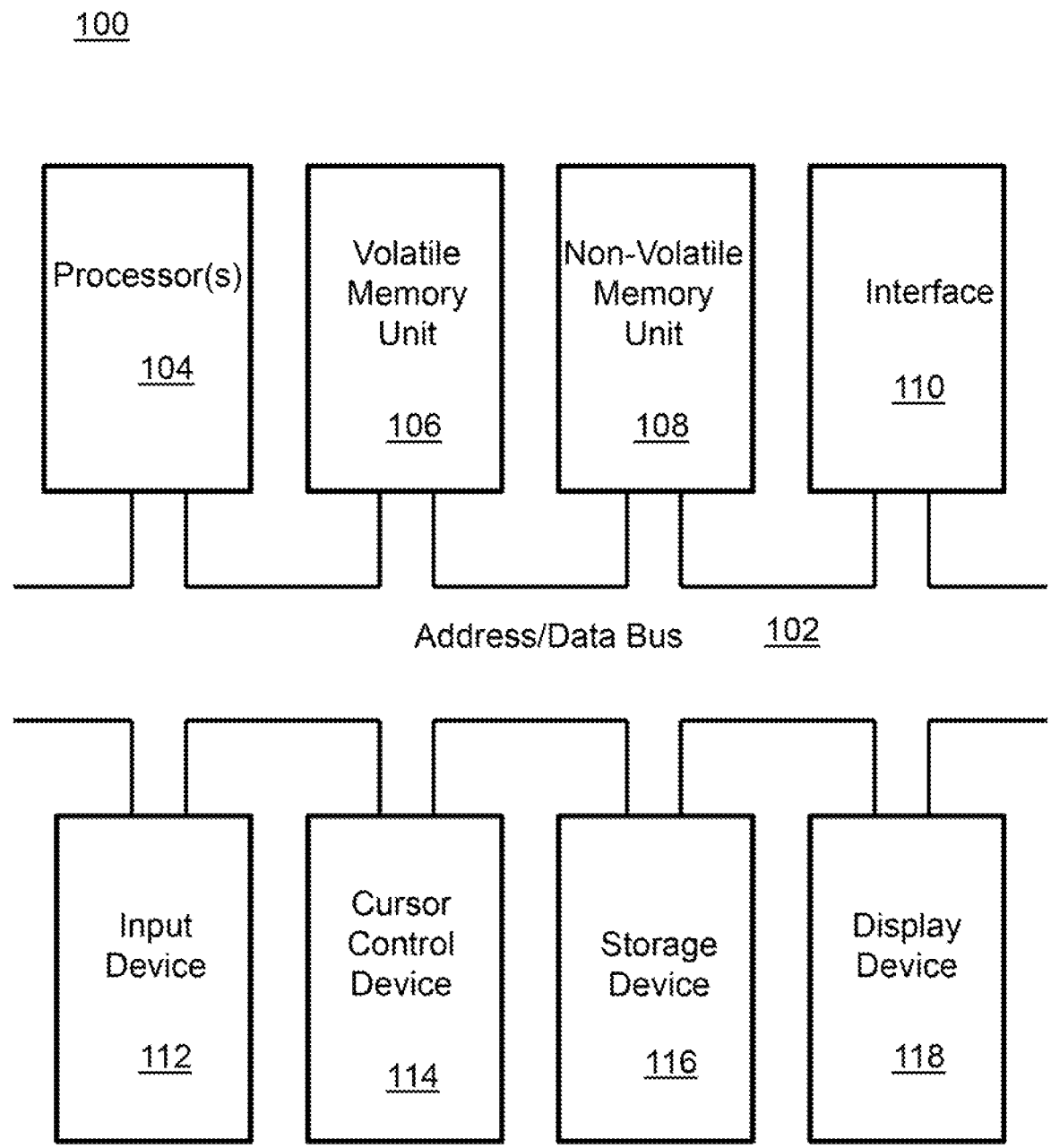
FIG. 1 is a block diagram depicting thee components of a system according to various embodiments of the present invention.

The present invention relates to a system for pattern matching and, more particularly, to a secure system for veneric pattern matchine. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it, will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully set forth herein. The references are cited in the application by referring to the corresponding literature reference number as follows:

1. Alfred V. Aho and Margaret J. Corasick. Efficient string matching: an aid to bibliographic search. *Commun. ACM,* 18:333 {340, June 1975.

2. Yonatan Aumarm and Yehuda Lindell. Security against covert adversaries:

Efficient protocols for realistic adversaries. *J. Cryptol,* 23:281 {343, April 2010.

3. Joshua Baron, Karim El Defrawy, Kirill Minkovich, Rafail Ostrovsky, and Eric Tressler. 5pm: Secure pattern matching. Cryptology ePrint Archive, Report 2012/698, 2012. eprint.iacr.org/.

4. Joshua Baron, Karim El Defrawy, Kirill Minkovich, Rafail Ostrovsky, and Eric Tressler. 5pm: Secure pattern matching. In Ivan Visconti and Roberto Prisco, editors, *Security and Cryptography for Networks*, volume 7485 of *Lecture Notes in Computer Science,* pages 222 {240. Springer Berlin Heidelberg, 2012.

5. Joshua Baron, Karim El Defrawy, Kirill Minkovich, Rafail Ostrovsky, and Eric Tressler. 5pm: Secure pattern matching. Journal of Computer Security, to appear, 2014.

6. Ronald Cramer, Rosario Gennaro, and Berry Schoenmakers. A secure and optimally e_cient multi-authority election scheme. Pages 103{118. Springer-Verlag, 1997.

7. Taher El Gamal. A public key cryptosystem and a signature scheme based on discrete logarithms. In *Proceedings of CRYPTO 84 on Advances in cryptology,* pages 10{18, New York, N.Y., USA, 1985. Springer-Verlag New York, Inc.

8. U.S. Pat. No. 9,311,595, filed on Jul. 17, 2014, entitled, "Neural Network Device with Engineered Delays for Pattern Matching and Storage."

9. Carmit Hazay and Tomas Toft. Computationally secure pattern matching in the presence of malicious adversaries. In *ASIACRYPT,* pages 195{212, 2010.

10. Jonathan Katz and Lior Malka. Secure text processing with applications to private DNA matching. *In Proceedings of the 17th ACM Conference on Computer and Communications Security,* CCS '10, pages 485 {492, New York, N.Y., USA, 2010. ACM.

11. Donald E. Knuth, James H. Morris, and Vaughan R. Pratt. Fast pattern matching in strings, 1974.

12. Richard M. Karp and Michael O. Rabin, E_cient randomized pattern-matching algorithms. *IBM J. Res. Dev.,* 31:249{260, March 1987.

13. Yehuda Lindell. Fast cut-and-choose based protocols for malicious and covert adversaries. In Ran Canetti and Juan A. Garay, editors, *Advances in Cryptology CRYPTO*2013, volume 8043 of *Lecture Notes in Computer Science,* pages 1{17. Springer Berlin Heidelberg, 2013.

14. K. Namjoshi and G. Narlikar. Robust and fast pattern matching for intrusion detection. In *INFOCOM, 2010 Proceedings IEEE,* pages 1{9, March 2010.

15. Structural joins: A primitive for e_cient XML query pattern matching. In *Proceedings of the* 18*th International Conference on Data Engineering,* ICDE '02, pages 141{, Washington, D.C., USA, 2002. IEEE Computer Society.

16. Security and privacy assurance research (spar) program broad agency announcement. In www.iarpa.gov/solicitationsspar.html.

17. Juan Ramón Troncoso-Pastoriza, Stefan Katzenbeisser, and Mehmet Celik. Privacy preserving error resilient DNA searching through oblivious automata. In *Proceedings of the* 14*th ACM Conference on Computer and Communications Security*, CCS '07, pages 519{528, New York, N.Y., USA, 2007. ACM.

18. Tsung-Hsi Tsai. Average case analysis of the Boyer-Moore algorithm. *Random Struct. Algorithms,* 28:481 {498, July 2006.

19. Damien Vergnaud. E_cient and secure generalized pattern matching via fast fourier transform. In Abderrahmane Nitaj and David Pointcheval, editors, *AFRICACRYPT* '11, volume 6737 of LNCS, pages 41 {58. Springer Berlin/Heidelberg, 2011.

(2) Principal Aspects

Various embodiments of the invention include three "principal" aspects. The first is a pattern matching system. The system is typically in the form of a computer system operating software or in the form of a "hard-coded" instruction set. This system may be incorporated into a wide variety of devices that provide different functionalities. The second principal aspect is a method, typically in the fora of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online>data storage unit such as in "Cloud" computing. In an aspect, the computer system 100 also may include one or more interfaces, such as an interface 110, coupled with the addressIdata bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a Cursor control device 114 coupled with the address/data bus 102, wherein the, cursor control device 114 is configured to communicate user input information and/or command selections to the processor 100. In an aspect, the cursor control device 114 is implemented using a device such as a mouse, a track-ball, a track -pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store intbrmation and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory -storage devices.

Figure 2:
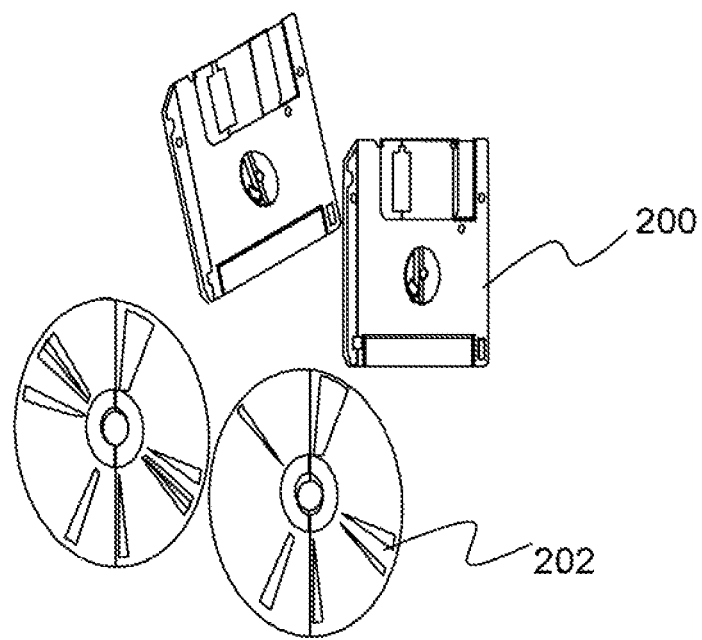
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The applicant and inventors of the system as described herein previously developed an insecure algorithm that can efficiently perform exact and approximate pattern matching and can handle wildcards (see Literature Reference No. 8). This disclosure improves upon the prior art by describing how to convert the insecure process as described in Literature Reference No. 8 into a secure pattern matching protocol that can be securely evaluated in the covert adversary model between two parties, $P_1$ and $P_2$. This disclosure provides the first pattern matching protocol designed specifically to be secure in this model. $P_1$ holds a pattern, p, and $P_2$ a text, T. $P_1$ and $P_2$ engage in a protocol that allows P1 to find out whether or not p is present in T. The security and privacy requirements are that $P_2$ does not learn any information about p or whether or not p is present in T. In some embodiments, $P_1$ should also not learn any information about T other than whether p is present in it or not. In some embodiments, both $P_1$ and $P_2$ are allowed to cheat and deviate arbitrarily from the protocol but with probability 1/2, they will be caught. Therefore, protocols secure in the covert model have the potential of strongly disincentivizing adversarial behavior while retaining relative efficiency close to that of protocols secure in the honest-but-curious security model, which is the weakest of the standard protocol security models.

The protocol as described herein is the first protocol in the literature that is secure in the covert adversary model and supports exact, single-character wildcards, and substring pattern matching. At the heart of sonic embodiments of the protocol lies a unique, efficient reduction of these functions to distributed matrix multiplication and certain linear operations. It is shown that matrix multiplication and these linear operations can then be securely evaluated in the covert adversary setting using additively homomorphic encryption schemes by taking advantage of the underlying linear algebra. The C-5PM protocol (see Literature Reference No. 5) is executed between two parties, one (Alice or P1) holding a text of length n and the other (Bob or P2) holding a pattern of length m that has to be securely matched against the text. Note that in computer literature, the generic names of Alice and Bob are often used to refer to party 1 (P1) and party 2 (P2), respectively. Importantly, it should be noted that Alice or Bob, and P1 and P2, although referred to as parties, are actually two separate communicating computing systems, including the relevant processors and memory. Thus, although the term "party" or "Alice" or "Bob" may be used, it is not intended to mean that a person or entity is performing the processes as described herein. Instead, the terms are used, in various embodiments, to describe two separate and distinct computing systems that are communicating with one another.

C-5PM requires $O((n+m)k)$ communication complexity for security parameter k, $O(nm)$ exponentiations, and can be implemented using only six one -way communication rounds. Thus, system and method requires a constant number of interaction rounds between the party holding the pattern and the party holding the text records to be searched. Further, the system and method rely on homomorphic operations on encrypted data and only requires a linear increase in memory whenever new patterns with wildcards are added.

A software-based implementation of this invention will be several orders of magnitude more efficient than a software-based implementation of the malicious model protocol of Literature Reference Nos. 3 through 5 (assuming both use the same programming language and other orthogonal optimizations such as threading etc.). The efficiency improvement is because the process of this disclosure does not require expensive zero-knowledge proofs.

Because the system and method is secure in the covert adversary model, any party that attempts to cheat as part of this protocol will be caught with 0.5 probability; therefore, for any interaction where an adversary must cheat repeatedly, or the disincentive for being caught is strong, this system and method will prevent cheating (e.g., trying to access a system without a proper access code). Based on that and as can be appreciated by those skilled in the art, there are many applications for the secure pattern matching process described in this disclosure, for instance:

1. It can be used by to build privacy-preserving database query engines that support expressive queries, i.e., queries that can handle wildeards, approximate matches and limited range queries (a single character wildcard allows a single digit range to be specified).

2. It can be used to implement secure and privacy-preserving deep packet inspection, which has several applications in networking security. For example, deep packet inspection may be used to detect viruses or spam, to route the packet being inspected, or to collect statistical information.

3. It can be used as part of a secure diagnostic system, which has applications in the automotive, aviation, and military industries.

Specific details regarding the generic pattern matching system and process are provided below (4) Specific Details of Various Embodiments As noted above, this disclosure provides a secure pattern matching system to address common pattern matching problems. The most common interpretation of the pattern matching problem is the following: given an alphabet $\Sigma$, a text $T \in \Sigma^n$ and a pattern $P \in \Sigma^m$, then the exact pattern matching decision problem requires one to decide if a pattern appears at all in the string. The exact pattern matching search problem requires finding all indices i of T (if any) where P occurs as a substring. If $T_i$ denotes the m-character substring of T starting at position i, the output should be the set $\{i | T_i = P\}$. In addition to the exact matching problem, the following generalizations of the exact matching problem are often encountered 1. Pattern matching with single character wildcards. There is a special character $? \in \Sigma$ that matches any single character of the alphabet; i.e., $?=a, \forall a \in \Sigma$. This special character can be repeated several times in the pattern $P \in \{\Sigma \cup \{?\}\}^m$. The output in this case should also be the set of indices: $\{i | T_i = P\}$. Using such a "wildcard" character allows one pattern to be specified that could match several sequences of characters. Here and throughout, DNA is used as the alphabet, i.e., $\Sigma = \{A, C, G, T\}$. Although not limited thereto, the pattern matching examples use for illustrative purposes DNA to simplify illustrations. For example, the pattern "TA?" would match any of the following words in a text: TAA, TAC, TAG, and TAT.

2. Substring pattern matching: fix some $k \leq m$. A match for P is found whenever there exists in T an m-length string that differs in n−k characters from P (i.e., has Hamming distance n-k from P). For example, the pattern TAC m=3. If k=2, then any of the following words would match (? Indicates that any single character from the alphabet could be substituted): ?AC, T?C, or TA?.

A secure version of pattern matching finds a lot of application in today's privacy-aware world that heavily relies on information technology. Currently, protecting database query patterns and information stored in records is of high importance. Described below are two concrete examples (among many) that highlight this need.

Secure pattern matching can help solve the problem of data sharing in the intelligence community. Laws and regulations often make it very hard or even impossible for members of the intelligence community to share information in their databases, even when doing so is vital to national security. Mechanisms are highly desired that allow agencies and individuals to request and dispense sensitive information from their databases while maximizing privacy (see Literature Reference No. 16). Secure pattern matching can be used as a building block to construct database query primitives that facilitate this without revealing any unnecessary information about the database or the query pattern. The typical setting would be that an information requester will be able to privately query an information provider's database and retrieve only the records that match its query pattern, without revealing the query or its results to the provider. The provider is also interested in not revealing any information other than the matched records.

Secure pattern matching can also help in securing databases containing health information and, specifically, personal DNA sequences. It is highly desired to prevent leakage of such data to certain organizations. At the same time, personal DNA sequences have to be used in analysis by (possibly unfrosted) third parties. For example, a person carrying a gene known to increase the likelihood of a particular disease may be denied coverage by health insurance or denied employment in certain positions if its DNA sequence is leaked. The need for privacy-preserving DNA querying mechanisms has already been highlighted in recent research (see Literature Reference Nos. 10 and 17).

(4.1) Covert Adversary Model

The original work introducing the coven security/adversary model (see Literature Reference No. 2) proposes two versions that capture the ideal world model of covert adversaries. Outlined here is the ideal world definition capturing the stronger version of security which are considered in this disclosure, including "Version 3: Strong Explicit Cheat Formulation" in Section 3.4 of Literature Reference No, 2, There is a slight difference between this strong notion and the weaker one described in "Version 2: Explicit Cheat Formulation" in Section 3.3 of Literature Reference No. 2. In the latter, the adversary can always cheat and obtain the honest party's input. In the former, the ideal model is modified so that the adversary only learns the honest party's input if the cheating goes undetected. This modification renders the strong explicit cheat formulation model significantly stronger than the explicit cheat fbrmulation, because the adversary must take the risk of being caught without knowing if it will gain anything at all.

The ideal model consists of a trusted party, TP, computing the pattern matching function f(x1, x2)=(y1, y2), two parties, P1 and P2, and an adversary, A. Consider P1 to be the party holding the pattern p, and P2 the party holding the text T. Note that in the pattern matching case both parties receive different outputs. Specifically, P1 receives the positions of matching locations in the text (if any) and P2 receives nothing, Without loss of generality, assume A corrupted P2 and that the length of both player's input is known beforehand to all players.

The ideal execution of the pattern matching function f proceeds as follows:

A—Inputs:
$\mathcal{P}_{i\,1}$ and $\mathcal{P}_{i\,2}$ hold 1" and inputs $x_1$=p and $x_2$=T, respectively; the adversary $\mathcal{A}$ receives an auxiliary input aux.

B—Sending Input to Trusted Party:
The honest party, $\mathcal{P}_{i\,1}$, sends its input $x_1$ to the trusted party TP. $\mathcal{P}_{i\,2}$, controlled by $\mathcal{A}$ may either send its received input, $x_2$, or send some other input of the same length to TP. This decision is made by $\mathcal{A}$ and may depend on the value of $x_2$ and aux. Denote the pair of inputs sent to TP as $(x'_1, x'_2)$.

C—Abort Options:
If $\mathcal{P}_{i\,2}$ sends $x'_2$=abort$_2$ to TP as its input, then TP sends abort$_2$ to $\mathcal{P}_{i\,1}$ and halts.
If $\mathcal{P}_{i\,2}$ sends $x'_2$=corrupted$_2$ to TP as its input, then TP sends corrupted$_2$ to $\mathcal{P}_{i\,1}$ and halts.

D—Attempted Cheat Option:
If the corrupted party, $\mathcal{P}_{i\,2}$, sends $x'_2$=cheat$_2$ to TP as its input, then TP works as follows:
 1. With probability $\epsilon$, TP sends corrupted$_2$ to $\mathcal{A}$ and $\mathcal{P}_{i\,1}$.
 2. With probability 1-$\epsilon$, TP sends undetected to $\mathcal{A}$ along with $\mathcal{P}_{i\,1}$'s input,
 $x'_1$. Following this, $\mathcal{A}$ sends TP output value $y'_1$. Then TP to $\mathcal{P}_{i\,1}$.

The ideal execution then ends at this point. If $x'_2$ does not equal abort$_2$, corrupted$_2$, or cheat$_2$, the ideal execution continues below.

E—Trusted Party Answers Adversary:
TP computes the pattern matching functionality using inputs of $\mathcal{P}_{i\,1}$ and $\mathcal{P}_{i\,2}$, $f(x'_1, x'_2)$=$(y_1, y_2)$, and sends $y_2$ to $\mathcal{A}$. Note that in the case of pattern matching $y_2$ is an empty string since the party holding the text does not receive any output.

F—Trusted Party Answers Honest Parties:
After receiving its outputs, $\mathcal{A}$ sends either abort$_2$, or continue to TP. If TP receives continue, it sends $y_1$ to $\mathcal{P}_{i\,1}$, Otherwise, if TP receives abort$_2$, it sends abort$_2$ to $\mathcal{P}_{i\,1}$.

G—Outputs:
The honest party, $\mathcal{P}_{i\,1}$, always outputs the message it obtained from TP, The corrupted party, $\mathcal{P}_{i\,2}$, outputs nothing. The adversary $\mathcal{A}$ outputs any arbitrary (probabilistic polynomial time computable fbnction) of the initial inputs of corrupted party, $x_2$, the auxiliary input aux and the messages obtained from TP.

(4.2) Reducing General Pattern Matching to Linear Operations

The rationale behind the design of the covert protocol relies on reducing pattern matching with single character wildcards and substring matching to linear matrix operations. The process of reducing matching to linear operations has been described in Literature Reference Nos. 3, 4, and 5, which is incorporated by reference as though fully set forth herein. One can then securely and efficiently evaluate those operations in the covert model which allows us to obtain the desired protocol.

(4.2.1) Pattern Matching Based on Linear Operations

This disclosure begins by describing how one can perform exact pattern matching using linear operations, which is followed by showing how one can handle single character wildcards and substring matching,

(4.2.1.1) Exact Matching

Exact pattern matching can be performed using the following steps:

1. Inputs: An alphabet $\Sigma$, a text $T \in \Sigma^n$ and a pattern $p \in \Sigma^m$.
2. Initialization: For each character in $\Sigma$, one constructs a vector, here termed a Character Shift Vector (CSV), of length equal to the pattern length, m.
These vectors are initialized with zeros. For example, if the pattern is: "TACT" over $\Sigma=\{A, C, G, T\}$, then the CSVs will be initialized to: CSV(A)=[0,0,0,0], CSV(C)=[0,0,0,0], CSV(G)=[0,0,0,0], CSV(T) [0,0,0,0].
3. Pattern preprocessing: For each pattern character $p_i (i \in \{1, \ldots, m\})$, a shift value, $s_{p_i}^r$, is computed to be the number of characters from $p_i$ to the end of the pattern, i.e., $s_{p_i}^r = m-i$ for the rth occurrence of $p_i$ in p. The $s_{p_i}^r$th position of CSV($p_i$) is set to 1. For example, the CSVs of "TACT" would be:

CSV(A)=[0,0,1,0] because $s_A^1 = 4-2 = 2$
CSV(C)=[0,1,0,0] because $s_C^1 = 4-3 = 1$
CSV(G)=[0,0,0,0] because $G \in p$
CSV(T)=[1,0,0,1] because $s_T^1 = 4-4 = 0$ and $s_T^2 = 4-1 = 3$ 4. Matching pass and comparison with pattern length: A vector of length n called the Activation Vector (AV) is constructed and its elements are initialized with zeros. For each input text character $T_j$, CSV ($T_j$) is added element-wise to the AV from position j to position min(n, j+m-1). To determine if there was a pattern match in the text after these operations, the algorithm checks if $AV_j = m$. if so, then the match started at position j-m+1. The value j-m+1 is added to the set of matching positions (MP).

The intuition behind the algorithm is that when an input text character matches a character in the pattern, the algorithm optimistically assumes that the following characters will correspond to the rest of the pattern characters. it then adds a 1 at the position in the activation vector several steps ahead, where it would expect the pattern to end (if the character appears in multiple positions in the pattern, it adds a 1 to all the corresponding positions where the pattern might end). If all subsequent characters are indeed characters in the pattern, then at the position where a pattern would end, the number of added 1s will sum to the pattern length's otherwise the sum will be strictly smaller.

(4.2.1.2) Single Character Wildcards, Pattern Hiding, and Substring Matching Single character wildcards can be handled by representing a single character wildcard with a special character, "?". When "?" is encountered in the pattern, the preprocessing phase it is simply ignored. Additionally, at the last step when elements of the AV are searched in the comparison phase, the threshold value being compared against will be m-l instead of m, where l is the number of occurrences of "?" in the pattern. The intuition behind single character wildcards is that by reducing the threshold for each wildcard, the algorithm implicitly skips matching that position in the text, allowing that position of the pattern to correspond to any character. This operation does not incur any false positives for the same reason that exact matching does not. There, for each pattern p, there is only one encoding into CSVs and only one sequence of adding CSVs as one moves along the text that could add up to m. The same reasoning holds when "?" is present in p (except that the sequence adds to m-l).

It is noted that, using single character wildcards, a pattern can always be formulated as a length n string by setting p' as the concatenation of p and a string of n-m wildcards, $?^{n-m}$, and using p' to execute pattern matching for p.

Substring matching, or matching text substrings of Hamming distance m-l from the pattern, is handled similarly to single character wildrards; the threshold value being compared against in the AV is decreased to m-l.

(4.2.2) Matrix Operators

Denote $\mathbb{M}_{n,m}(R)$ as the set of n by m matrices with coefficients in the ring R. Consider a matrix $A \in M_{k,l}(\mathbb{Z}_a)$ (i.e., the set of k by l matrices with coefficients in $\mathbb{Z}_a$ for some integer a). One can construct a $k \times (k+l-1)$ matrix A' by initializing A' as a matrix with all 0s and then, for each row $1 \le i \le k$, setting $((A'(i,i), \ldots, A'(i,i+l-1)) = (A(i,1), \ldots, A(i,l)))$. Such a function is denoted by $A' \leftarrow$ Stretch(A), and since this function is a linear operator, it can be computed using matrix multiplication. It was observed that for any encryption E, E(Stretch(A))=Stretch(E(A)), where E is applied to each entry in A.

Consider a matrix. $A \in M_{k,l}(\mathbb{Z}_a)$. Denote Cut (A,j) as the matrix $A' \in M_{k,l-j+1}$ such that for $1 \le a \le k$, $1 \le b \le l-j+1$, $A'(a,b) = A(a,b+j-1)$. In particular, such a function outputs the last $l-j+1$ columns of $M_{k,l}$. It is noted that Cut is a simple projection operator and is also computable by matrix multiplication. It was observed that for any encryption scheme E, E(Cut(A,j))=Cut(E(A),j).

Finally, consider a matrix. $A \in M_{k,l}(\mathbb{Z}_a)$. Denote by Col-Sum(A) the function that takes as input A and outputs a $1 \times l$ vector whose ith entry is the sum of all entries in the i column of A. In particular, ColSum(A)=[1 . . . 1]·A. It was observed that for any additively homomorphic encryption scheme E, ColSum(E(A))=E(ColSum(A)).

Since these functions will be composed, a shorthand for their composition will be convenient. For matrices $A \in M_{k,l}(\mathbb{Z}_a)$ and $B \in M_{l,m}(\mathbb{Z}_a)$, the composition function ColSum(Cut(Stretch(A·B), m-1)) is denoted by 5PM(A,B).

(4.2.3) Converting Pattern Matching to Linear Matrix and Vector Operations

For a fixed alphabet $\Sigma$, a text $T \in \Sigma n$, and pattern $p \in (E \cup \{?\})$ m, pattern matching can be represented in terms of linear operations described above as follows, using the linear operations described above in the Matrix Operations section:

1. The text T can be transformed into an $n \times |\Sigma|$ matrix, MT. The transformation is performed by applying a unary encoding of alphabet characters to T, i.e., MT(i, Ti)=1, $\forall i \in \{1, \ldots, n\}$; all other entries in MT are 0. Denote the algorithm that computes MT from T as MT←GenMT (T).
2. The CSVs of alphabet characters can be grouped into a $|\Sigma| \times m$ matrix, MCSV. This step is equivalent to constructing CSVs for alphabet characters (steps 2 and 3 in Section "Pattern Matching Based on Linear Operations").). The algorithm that computes MCSV from p is denoted as MCSV←GenMCSV(p).
3. Multiply MT by MCSV to obtain an $n \times m$ matrix MT (SV) that represents T row-wise in terms of CSVs, where the ith row is CSV (Ti). In reality, since MT and MCSV are matrices where ever entry is either a 0 or a 1, multiplication is more computationally expensive than necessary, and vectors can simply be selected.
4. Compute MT (CSV)=Stretch(MT(CSV)). This transformation, jointly with the previous step, constructs a matrix of CSVs where the ith row contains only CSV (Ti), which starts in the ith position in the ith row (sets up step 4 in Section "Pattern Matching Based on Linear Operations").
5. Compute AV=ColSum(Cut(MT(CSV), n)) to obtain the final activation vector AV of length n. Entries in AV are checked to see if any are equal to the threshold value m or m-l for single character wildcards or substring matching (completes step 4 in Section "Pattern Matching Based on Linear Operations").

(4.3) Protocol for Covertly Searching Data

This section describes how to construct the generic pattern matching protocol with covert security based on the breakdown of pattern matching into linear matrix and vector operations as described in section "Converting Pattern Matching to Linear Matrix and Vector Operations".

(4.3.1) Notation

As shorthand, $Enc_P(m, r)$ is denoted as encryption by party P for message m using randomness r with secret key $sk_p$ and public key $pk_p$; when discussion of r will not be necessary later, r may be omitted. Further, when $\vec{m}=(m_1, \ldots, m_l)$, notation may also he abused by referring to $Enc_p(\vec{m},r)$ instead of $Enc_p(m_1, r_1), \ldots Enc_p(m_l, r_l)$. It will be implicity assumed that $\vec{r}=(r_1, \ldots, r_l)$.

$Enc_p: \mathbb{Z}_p \times \mathbb{Z}_p 43\ G_q$, where $p=O(k)$ and $G_q$ is the cyclic group of order q with operation $\otimes$; in the case of ElGarmal encryption (see Literature Reference No. 7), both p and q are prime numbers. Further, it is assumed that when a party computes an encryption, each random input is implicitly selected uniformly and independently at random, it is assumed that $Enc(m_1, r_1) \otimes Enc(m_2, r_2) = Enc(m_1+m_2, r_1+r_2)$; additive ElGamal encryption (see Literature Reference No. 6) is an example of such a scheme. it is further assumed that given $Enc_p(m_1, r_1)$, $m_1$, $r_1$, and $pk_p$, any other party can efficiently verify that $Enc_p(m_1, r_1)$ is an encryption of $m_1$ using public key $pk_p$ and randomness $r_1$; such a scheme is called a verifiable public-key encryption scheme. ElGamal encryption is an example of a verifiable public-key encryption scheme.

Without loss of generality, the function notation 5PM(·) may he abused to denote the function that operates correspondingly on encrypted messages (so that addition as specified by the function is actually $\otimes$, etc.). Use all the formatting notation and algorithms of section "Converting Pattern Matching to Linear Matrix and Vector Operations" (e.g., formatting MCSV from p and MT from T). In what follows, interpret the set $\{0,1\}$ as the set $\mathbb{Z}_2$ $(=\mathbb{Z}/2\mathbb{Z})$. Denote $\mathbb{M}_{n,m}(R)$ as the set of n by m matrices with coefficients in the ring R.

Denote $S_a^b$ as the group of ordered b-tuples of permutations on the set $\{1, \ldots, a\}$.

Regarding notation, write that for two elements of $G_q^n$, $(a_1, \ldots, a_n) \otimes (b_1, \ldots, b_n) = (a_1 \otimes b_1, \ldots, a_n \otimes b_n)$. Denote $*: \mathbb{Z}_p^n \times \mathbb{Z}_p^n \to \mathbb{Z}_p^n$ as the function such that $(a_1, \ldots, a_n)*(b_1, \ldots, b_2) \to (a_1 b_1, \ldots, a_n b_n)$. Denote $(*)$: $G_q^n \times \mathbb{Z}^n \to G_q^n$ as the function such that $(a_1, \ldots, a_n)(*)(b_1, \ldots, b_n) \to (a_1^{b_1}, \ldots, a_n^{b_n})$.

(4.3.2) Protocol

The pattern matching protocol according to various embodiments of this disclosure is presented below and summarized in FIG. 3 as referenced further below. In this protocol, Alice (or P1) possesses text $T \in \Sigma n$ as well as secret key $sk_A$ and public key $pk_A$ for a verifiable public key encryption scheme. Bob (or P2) possesses pattern $p \in \{\Sigma \cup \{?\}\}$ as well as secret key $sk_B$ and public key $pk_B$ for a verifiable public key encryption scheme. Assume that Alice possesses $pk_B$, and Bob possesses $pk_A$. The detailed pattern matching protocol procedure is as set forth in the steps below:

1. (a) (Pattern input) Bob constructs $M_{CSV}$ from p.
   (b) Bob selects matrices $M_{CSV_0}$ and $M_{CSV_1}$ uniformly and independently at random from the set of $\mathbb{M}_{|\Sigma|+1,m}(\mathbb{Z}_2)$ restricted so that every column has exactly one 1 and the rest 0s.
   (c) Bob selects permuations $\pi_0$, $\pi_1$ from $S_{|\Sigma|+1}^m$, interpreted as an ordered m-tuple of permutations on columns, such that computing $\pi_i(M_{CSV_i})$ and removing the last row equals $M_{CSV}$ for $i \in \{0,1\}$.
   (d) Bob computes encryptions $Enc_B(M_{CSV_0}, r_{CSV_0})$ and $Enc_B(M_{CSV_1}, r_{CSV_1})$ and sends them to Alice.

2. Alice selects a challenge bit $b_1$ uniformly and independently at random and sends $b_1$ to Bob.

3. (a) Bob computes encryption $Enc_B(M_{CSV})$ by first computing $$\pi_{1-b_1}(Enc_B(M_{CSV_{1-b_1}}, r_{CSV_{1-b_1}}))$$

and then removing the last row.

(b) Bob sends $$M_{CSV_{b_1}}, r_{CSV_{b_1}},$$

and $\pi_{1-b_1}$ to Alice.

4. (a) Alice checks $$pk_B, M_{CSV_{b_1}}, \text{and }, r_{CSV_{b_1}} \text{ that } Enc_B(M_{CSV_{b_1}}, r_{CSV_{b_1}})$$

was correctly computed; if not, Alice outputs "cheating" (i.e., designates that Bob (P2) is a cheater) and aborts.

(b) Otherwise, Alice computes $Enc_B(M_{CSV})$ by first computing $$\pi_{1-b_1}(Enc_B(M_{CSV_{1-b_1}}, r_{CSV_{1-b_1}}))$$

and then removing the last row.

5. (Text Input) Alice constructs $M_T$ from T.
   (b) Alice selects matrices $M_{T_0}$ and $M_{T_1}$ uniformly and independently at random from the set of $\mathbb{M}_{n,|\Sigma|}(\mathbb{Z}_2)$ restricted so that every row has exactly one 1 and the rest 0s.
   (c) Alice selects permutations $\gamma_0, \gamma_1$ from $S_{|\Sigma|}^n$, interpreted as an ordered n-tuple of permutations on rows, such that $\gamma_i(M_{T_i})=M_T$ for $i \in \{0,1\}$.
   (d) Alice computes encryptions $Enc_A(M_{T_0}, r_{T_0})$ and $Enc_A(M_{T_1}, r_{T_1})$ and sends them to Bob.

6. Bob selects a challenge bit $b_2$ uniformly at random and sends $b_2$ to Alice.

7. (a) Alice sets $$Enc_A(M_T) = \gamma_{1-b_2}(Enc_A(M_{T_{1-b_2}}, r_{T_{1-b_2}})).$$

(b) Alice sends Bob $$M_{T_{b_2}}, r_{T_{b_2}}, \gamma_{1-b_2}.$$

8. (a) Bob checks using $$pk_A, M_{T_{b_2}}, \text{and } r_{T_{b_2}} \text{ that } Enc_A(M_{T_{b_2}}, r_{T_{b_2}})$$

was correctly computed; if not, Bob outputs cheating and aborts.

(b) Otherwise, Bob computes $$Enc_A(M_T) = \gamma_{1-b_2}(Enc_A(M_{T_{1-b_2}}, r_{T_{1-b_2}})).$$

9. (a) Alice selects $M_0$ uniformly at random from $\mathbb{M}_{n,|\Sigma|}(\mathbb{Z}_2)$ and sets $M_1=M_T-M_0$.
(b) Alice selects $Z_0$ and $Z_1$ uniformly and independently at random from $Z_2^{n-m+1}$ and sets $Z=Z_0+Z_1$.
(c) For $i \in \{0,1\}$, Alice computes $K_i=5PM(M_i \cdot Enc_B(M_{CSV})) \otimes Enc_B(Z_i)^{-1}$.
(d) Alice computes
$K'=5PM(M_T \cdot Enc_B(M_{CSV})) \otimes Enc_B(Z_i)^{-1}=K_0 \otimes K_1$.
(e) Alice computes $Enc_A(M_0, r_{M_0})$, $Enc_A(M_1, r_{M_1})$, $Enc_A(Z_0, r_{Z_0})$, and $Enc_A(Z_1, r_{Z_1})$ and sends them as well as $K_0$ and $K_1$ to Bob.

10. Bob selects a challenge bit $b_3$ uniformly and independently at random and sends $b_3$ to Alice.

11. Alice sends $$M_{b_3}, r_{M_{b_3}}, Z_{b_3}, \text{ and } r_{Z_{b_3}}$$

to Bob.

12. (a) Bob checks using $$pk_A, M_{b_3}, r_{M_{b_3}}, Z_{b_3},$$

and $r_{Z_{b_3}}$ that $Enc_A(M_{b_3}, r_{M_{b_3}})$ and $Enc_A(Z_{b_3}, r_{Z_{b_3}})$ were correctly computed; if not, Bob outputs cheating and aborts.

(b) Bob checks that $K_{b_3}$ is correctly formatted, using $M_{CSV}$, $M_{b_3}$, and $Z_{b_3}$ by checking that $Dec_B(K_{b_3})=5PM(M_{b_3} \cdot M_{CSV})-Z_{b_3}$; if not, Bob outputs cheating and aborts.
(c) Otherwise, Bob computes $K'=K_0 \otimes K_1$.

13. (a) Alice selects $u_0$, $u_1$, and $v_1$ uniformly and independently at random from $Z_2^{n-m+1}$.
(b) Alice computes $Z^*v_0$, $Z^*v_1$, $(K'(*)v_0) \otimes Enc_B(u_0))$ and $(K'(*)v_1) \otimes Enc_B(u_1))$.
(c) Alice computes $Enc_A(u_0, r_{u_0})$, $Enc_A(u_1, r_{u_1})$, $Enc_A(v_0, r_{v_0})$, $Enc_A(v_1, r_{v_1})$, $Enc_A(Z^*v_0, r_0)$ and $Enc_A(Z^*v_1, r_1)$ and sends them as well as $(K'(*)v_0) \otimes Enc_B(u_0))$ and $(K'(*)v_1) \otimes Enc_B(u_1))$ all to Bob.

14. Bob selects a challenge bit $b_4$ uniformly and independently at random and sends $b_4$ to Alice.

15. Alice sends $$u_{b_4}, r_{u_{b_4}}, v_{b_4}, \text{ and } r_{v_{b_4}}$$

to Bob as well as $(Z^*v_{1-b_4}-u_{1-b_4})$ with the randomness $$r_{1-b_4} - r_{u_{1-b_4}}$$

used to compute the encryption.

16. (a) Bob checks using $$pk_A, u_{b_4}, r_{u_{b_4}}, v_{b_4}, \text{ and } r_{v_{b_4}}, (Z*v_{1-b_4} - u_{1-b_4}), r'$$

that the respective decryptions were correctly formatted and, if so, continues; if not Bob outputs cheating and aborts.
(b) Bob checks that $K'^*v_{b_4}+u_{b_4}$ is correctly constructed from $K'$, $v_{b_4}$, $u_{b_4}$ and if so, continues; if not, Bob outputs cheating and aborts.
(c) Bob computes
answer=$[Dec_B(K')^*v_{1-b_4}+u_{1-b_4}]+[Z^*v_{1-b_4}-u_{1-b_4}]$. By construction, this equals $[5PM(M_T \cdot M_{CSV})^*v_{1-b_4}-Z^*v_{1-b_4}+u_{1-b_4}]+[Z^*v_{1-b_4}]=5PM(M_T \cdot M_{CSV})^*v_{1-b_4}$. Bob outputs answer. Note that the answer in this case is a determination of whether or not pattern p is within text T. In other words, do the patterns match?

This protocol requires $O(m \cdot n)$ exponentiations and multiplications and $O((m+n)k)$ communication.

(4.3.3) Reducing the Number of Rounds

Figure 3:
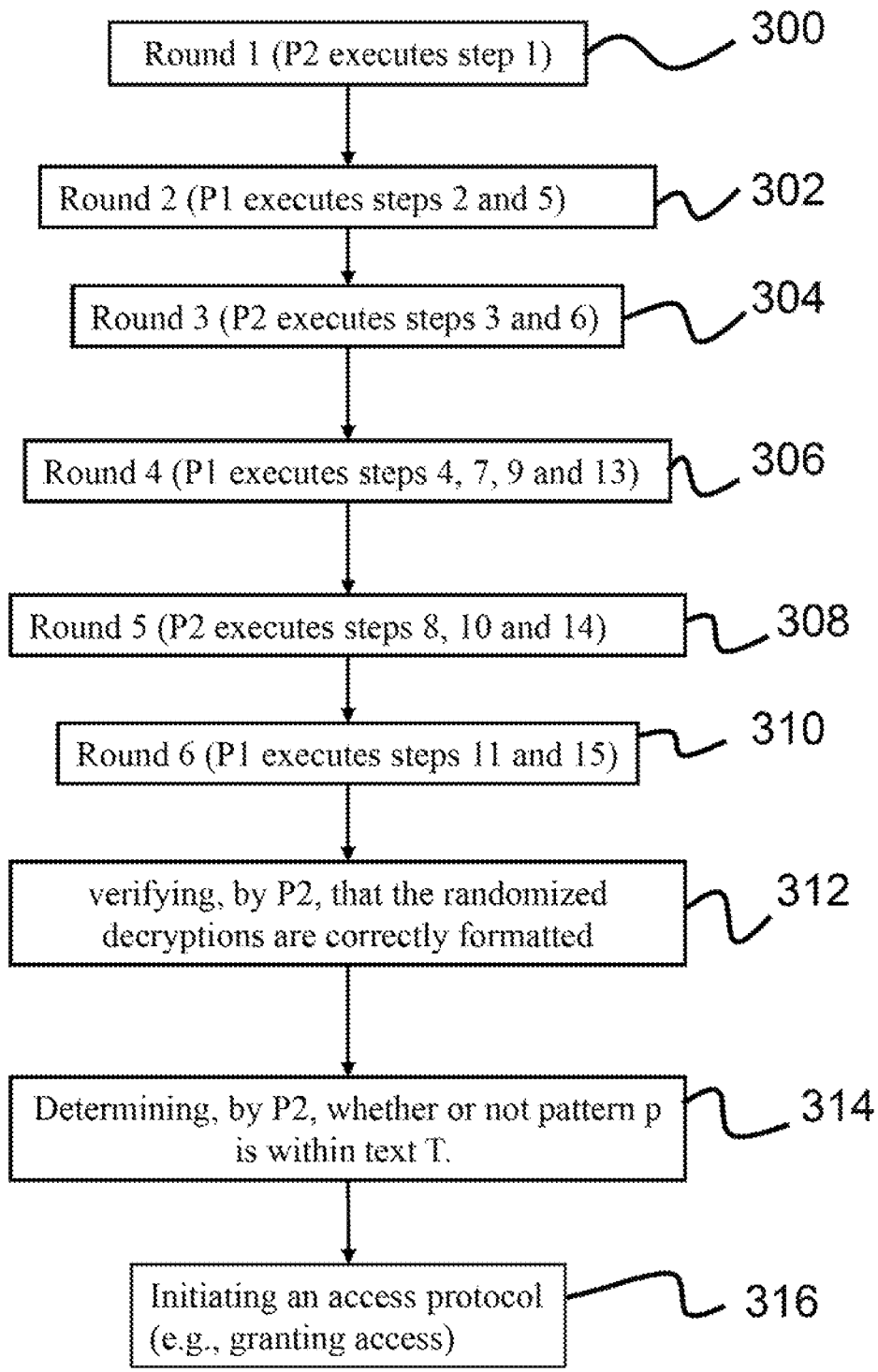
FIG. 3 is a flow chart illustrating a generic pattern matching process according to various embodiments of the present invention.

As shown in FIG. 3, the protocol above can be reduced to six one-way communication rounds or operations as follows, where, steps listed below refer to the steps above:

1. Round 1 (P2 executes step 1) 300: generating, by P2 and based on pattern p, a first binary value matrix $M_{CSV}$ and a corresponding first pair of encrypted permuted matrices;

2. Round 2 (P1 executes steps 2 and 5) 302: generating, by P1, a first random challenge bit and, based on text T, generating a second binary value matrix (MT) and a corresponding second pair of encrypted permuted matrices;

3. Round 3 (P2 executes steps 3 and 6) 304: applying, by P2 and based on the first random challenge bit, a permutation to one of the first pair of encrypted permuted matrices and transmitting encrypted results to P1, and generating a second random challenge bit, wherein information sent by P2 to P1 allows P1 to verify correctness of steps performed by P2 during Round 1 (i.e., operation (a));

4. Round 4 (P1 executes steps 4, 7, 9 and 13) 306: verifying, by P1, that the encrypted results correspond to the first pair of encrypted permuted matrices, such that if not, P1 aborts and declares P2 as a cheater, otherwise P1 continues and generates an encryption of one of the encrypted permuted matrices corresponding to $M_T$ as generated by P1 during operation (b) (already generated by P1 in Round 2), and sends it to P2;

5. Round 5 (P2 executes steps 8, 10 and 14) 308: verifying, by P2, that the encrypted permuted matrix corresponding to $M_T$ sent by P1 in the previous operation is correct such that if not, P2 aborts and declares P1 as a cheater, otherwise P2 continues by generating third and fourth random challenge bits;

6. Round 6 (P1 executes steps 11 and 15) 310: formatting, by P1 and based on the third and fourth random challenge bits, randomized decryptions for results of multiplying an encrypted matrix corresponding to pattern p of P2 and text T of P1.

Verification/Output. Bob executes steps 12 and 16. (Note that this round does not involve communication between parties; it consists of verification and output computation.) For example, the process includes verifying 312, by P2, that the randomized decryptions are correctly formatted, such that if not, P2 aborts and declares P2 as a cheater, otherwise P2 continues. As an output, P2 determines 314 whether or not pattern p is within text T. For example, if the randomized decryptions are correctly thrmatted, then it is determined that pattern p is within text T.

The determination 314 or whether or not pattern p is within text T can be used to cause the system to implement a variety of protocols, depending on the particular application and implement. For example, if it is determined that pattern p is within text T, then the system initiates an access protocol 316, such as causing the system to perform an operation of granting access to an otherwise locked system (such as a computer terminal or node in a network), or electronically unlocking a security door to a facility, or unlocking a door to a vehicle, or starting a vehicle, etc.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A computer implemented method for pattern matching between a first system P1 and a second system P2, the method comprising operations of:
   generating, by P2 and based on pattern p, a first binary value matrix $M_{CSV}$ and a corresponding first pair of encrypted permuted matrices;
   generating, by P1, a first random challenge bit and, based on text T, generating a second binary value matrix ($M_T$) and a corresponding second pair of encrypted permuted matrices;
   applying, by P2 and based on the first random challenge bit as received from P1, a permutation to one of the first pair of encrypted permuted matrices and transmitting encrypted results to P1, and generating a second random challenge bit;
   verifying, by P1, that the encrypted results correspond to the first pair of encrypted permuted matrices, such that if not, P1 aborts and declares P2 as a cheater, otherwise P1 continues and generates an encryption of one of the second pair of encrypted permuted matrices corresponding to $M_T$ as generated by P1;
   verifying, by P2, that the encrypted permuted matrix corresponding to $M_T$ as received by P1 is correct such that if not, P2 aborts and declares P1 as a cheater, otherwise P2 continues by generating third and fourth random challenge bits;
   formatting, by P1 and based on the third and fourth random challenge bits, randomized decryptions for results of multiplying an encrypted matrix corresponding to pattern p and text T;
   verifying, by P2, that randomized decryptions as received from P1 are correctly formatted, such that if not, P2 aborts and declares P2 as a cheater, otherwise P2 continues; and
   determining, by P2, whether or not pattern p is within text T based on the randomized decryptions;
   initiating an access protocol if pattern p is within text T; and
   wherein in initiating the access protocol, one or more processors unlock a node in a network to grant access to the node to P2.

2. The computer implemented method as set forth in claim 1, wherein generating, by P1, the first random challenge bit and, based on text T, generating a second binary value matrix ($M_T$) and a corresponding second pair of encrypted permuted matrices, further comprises operations of:
   selecting the first random challenge bit $b_1$ uniformly and independently at random and sends $b_1$ to P2;
   constructing the second binary value matrix ($M_T$) from T;
   selecting matrices $M_{T_0}$ and $M_{T_1}$ uniformly and independently at random from a set of $\mathbb{M}_{n,|\Sigma|}(\mathbb{Z}_2)$ restricted so that every row has exactly one 1 and remaining numbers in every row includes 0s;
   selecting permutations $\gamma_0, \gamma_1$ from $S_{|\Sigma|}^n$, interpreted as an ordered n-tuple of permutations on rows, such that $\gamma_i(M_{T_i}) = M_T$ for $i \in \{0,1\}$; and
   computing the second pair of encrypted permuted matrices $Enc_A(M_{T_0}, r_{T_0})$ and $Enc_A(M_{T_1}, r_{T_1})$ and transmitting the second pair of encrypted permuted matrices to P2.

3. The computer implemented method as set forth in claim 1 wherein verifying, by P1, that the encrypted results correspond to the first pair of encrypted permuted matrices and generating an encryption of one of the encrypted permuted matrices corresponding to $M_T$, further comprises operations of:
   checking $$pk_B, M_{CSV_{b_1}}, \text{ and, } r_{CSV_{b_1}} \text{ that } Enc_B(M_{CSV_{b_1}}, r_{CSV_{b_1}})$$

was correctly computed, such that if not, P1 aborts and declares P2 as a cheater, otherwise continuing;
   determining $Enc_B(M_{CSV})$ by first computing $$\pi_{1-b_1}(Enc_B(M_{CSV_{1-b_1}}, r_{CSV_{1-b_1}})$$

and then removing a last row;
   setting $$Enc_A(M_T) = \gamma_{1-b_2}(Enc_A(M_{T_{1-b_2}}, r_{T_{1-b_2}}));$$

transmitting $$M_{T_{b_2}}, r_{T_{b_2}}, \gamma_{1-b_2}$$

to P2;
   selecting $M_0$ uniformly at random from $\mathbb{M}_{n,|\Sigma|}(\mathbb{Z}_2)$ and setting $M_1 = M_T - M_0$;
   selecting $Z_0$ and $Z_1$ uniformly and independently at random from $Z_2^{n-m+1}$ and setting $Z = Z_0 + Z_1$;
   for $i \in \{0,1\}$, computing $K_i = 5PM(M_i \cdot Enc_B(M_{CSV})) \otimes Enc_B(Z_i)^{-1}$;
   computing $K' = 5PM(M_T \cdot Enc_B(M_{CSV})) \otimes Enc_B(Z_i)^{-1} = K_0 \otimes K_1$;
   computing and transmitting $Enc_A(M_0, r_{M_0})$, $Enc_A(M_1, r_{M_1})$, $Enc_A(Z_0, r_{Z_0})$, and $Enc_A(Z_1, r_{Z_1})$ to P2, and transmitting $K_0$ and $K_1$ to P2;

selecting $u_0$, $u_1$, and $v_1$ uniformly and independently at random from $Z_2^{n-m+1}$;

computing $Z^*v_0$, $Z^*v_1$, $(K'(*)v_0) \otimes Enc_B(u_0))$ and $(K'(*)v_1) \otimes Enc_B(u_1))$; and computing and transmitting $Enc_A(u_0, r_{u_0})$, $Enc_A(u_1, r_{u_1})$, $Enc_A(v_0, r_{v_0})$, $Enc_A(v_1, r_{v_1})$, $Enc_A(Z^*v_0, r_0)$ and $Enc_A(Z^*v_1, r_1)$ to P2 and transmitting $(K'(*)v_0) \otimes Enc_B(u_0))$ and $(K'(*)v_1) \otimes Enc_B(u_1))$ to P2.

4. The computer implemented method as set forth in claim 1, wherein generating, by P2 and based on pattern p, a first binary value matrix $M_{CSV}$ and a corresponding first pair of encrypted permuted matrices, further comprises operations of:

constructing the first binary value matrix $M_{CSV}$ from pattern p;

selecting matrices $M_{CSV_0}$ and $M_{CSV_1}$ uniformly and independently at random from a set of $\mathbb{M}_{|\Sigma|+1,m}(\mathbb{Z}_2)$ restricted so that every column has exactly one 1 and remaining numbers in every column includes 0s;

selecting permutations $\pi_0$, $\pi_1$ from $S_{|\Sigma|+1}^m$, interpreted as an ordered m-tuple of permutations on columns, such that computing $\pi_i(M_{CSV_i})$ and removing the last row equals $M_{CSV}$ for $i \in \{0,1\}$; and computing the first pair of encrypted permuted matrices as $Enc_B(M_{CSV_0}, r_{CSV_0})$ and $Enc_B(M_{CSV_1}, r_{CSV_1})$ and transmitting the first pair of encrypted permuted matrices to P1.

5. The computer implemented method as set forth in claim 1, wherein applying, by P2 and based on the first random challenge bit, a permutation to one of the first pair of encrypted permuted matrices and transmitting encrypted results to P1, and generating a second random challenge bit, further comprises operations of:

computing encryption $Enc_B(M_{CSV})$ by first computing $$\pi_{1-b_1}(Enc_B(M_{CSV_{1-b_1}}, r_{CSV_{1-b_1}}))$$

and then removing a last row;

transmitting $$M_{CSV_{b_1}}, r_{CSV_{b_1}}, \text{ and } \pi_{1-b_1}$$

to P1; and selecting the second random challenge bit $b_2$ uniformly at random and transmitting $b_2$ to P1.

6. The computer implemented method as set forth in claim 1, wherein verifying, by P2, that the encrypted permuted matrix corresponding to $M_T$ is correct and generating third and fourth random challenge bits, further comprises operations of:

using $$pk_A, M_{T_{b_2}}, \text{ and } r_{T_{b_2}},$$

checking that the encrypted permuted matrix corresponding to $M_T$, denoted as $$Enc_A(M_{T_{b_2}}, r_{T_{b_2}})$$

was correctly computed, such that if not, P2 aborts and declares P1 as a cheater, otherwise P2 continues;

computing $$Enc_A(M_T) = \gamma_{1-b_2}(Enc_A(M_{T_{1-b_2}}, r_{T_{1-b_2}}));$$

selecting the third random challenge bit $b_3$ uniformly and independently at random and sending $b_3$ to P1; and selecting the fourth random challenge $b_4$ uniformly and independently at random and sending $b_4$ to P1.

7. A generic pattern matching system for pattern matching between a first system P1 and a second system P2, the system comprising:

one or more processors having associated memory with executable instructions encoded thereon, wherein upon execution of the instructions, the one or more processors perform operations of:

generating, by P2 and based on pattern p, a first binary value matrix $M_{CSV}$ and a corresponding first pair of encrypted permuted matrices;

generating, by P1, a first random challenge bit and, based on text T, generating a second binary value matrix $(M_T)$ and a corresponding second pair of encrypted permuted matrices;

applying, by P2 and based on the first random challenge bit as received from P1, a permutation to one of the first pair of encrypted permuted matrices and transmitting encrypted results to P1, and generating a second random challenge bit;

verifying, by P1, that the encrypted results correspond to the first pair of encrypted permuted matrices, such that if not, P1 aborts and declares P2 as a cheater, otherwise P1 continues and generates an encryption of one of the second pair of encrypted permuted matrices corresponding to $M_T$ as generated by P1;

verifying, by P2, that the encrypted permuted matrix corresponding to $M_T$ as received by P1 is correct such that if not, P2 aborts and declares P1 as a cheater, otherwise P2 continues by generating third and fourth random challenge bits;

formatting, by P1 and based on the third and fourth random challenge bits, randomized decryptions for results of multiplying an encrypted matrix corresponding to pattern p and text T;

verifying, by P2, that randomized decryptions as received from P1 are correctly formatted, such that if not, P2 aborts and declares P2 as a cheater, otherwise P2 continues; and determining, by P2, whether or not pattern p is within text T based on the randomized decryptions;

initiating an access protocol if pattern p is within text T; and wherein in initiating the access protocol, one or more processors unlock a node in a network to grant access to the node to P2.

8. The system as set forth in claim 7, wherein generating, by P1, the first random challenge bit and, based on text T, generating a second binary value matrix $(M_T)$ and a corresponding second pair of encrypted permuted matrices, further comprises operations of:

selecting the first random challenge bit $b_1$ uniformly and independently at random and sends $b_1$ to P2;

constructing the second binary value matrix $(M_T)$ from T;

selecting matrices $M_{T_0}$ and $M_{T_1}$ uniformly and independently at random from a set of $\mathbb{M}_{n,|\Sigma|}(\mathbb{Z}_2)$ restricted so that every row has exactly one 1 and remaining numbers in every row includes 0s;

selecting permutations $\gamma_0, \gamma_1$ from $S_{|\Sigma|}^n$, interpreted as an ordered n-tuple of permutations on rows, such that $\gamma_i(M_{T_i}) = M_T$ for $i \in \{0,1\}$; and computing the second pair of encrypted permuted matrices $\text{Enc}_A(M_{T_0}, r_{T_0})$ and $\text{Enc}_A(M_{T_1}, r_{T_1})$ and transmitting the second pair of encrypted permuted matrices to P2.

9. The system as set forth in claim 7, wherein verifying, by P1, that the encrypted results correspond to the first pair of encrypted permuted matrices and generating an encryption of one of the encrypted permuted matrices corresponding to $M_T$, further comprises operations of:

checking $$pk_B, M_{CSV_{b_1}}, \text{ and, } r_{CSV_{b_1}} \text{ that } Enc_B(M_{CSV_{b_1}}, r_{CSV_{b_1}})$$

was correctly computed, such that if not, P1 aborts and declares P2 as a cheater, otherwise continuing;

determining $\text{Enc}_B(M_{CSV})$ by first computing $$\pi_{1-b_1}(Enc_B(M_{CSV_{1-b_1}}, r_{CSV_{1-b_1}}))$$

and then removing a last row;
setting $$Enc_A(M_T) = \gamma_{1-b_2}(Enc_A(M_{T_{1-b_2}}, r_{T_{1-b_2}}));$$

transmitting $$M_{T_{b_2}}, r_{T_{b_2}}, \gamma_{1-b_2}$$

to P2;

selecting $M_0$ uniformly at random from $\mathbb{M}_{n,|\Sigma|}(\mathbb{Z}_2)$ and setting $M_1 = M_T - M_0$;

selecting $Z_0$ and $Z_1$ uniformly and independently at random from $Z_2^{n-m+1}$ and setting $Z = Z_0 + Z_1$;

for $i \in \{0,1\}$, computing $K_i = 5PM(M_i \cdot \text{Enc}_B(M_{CSV})) \otimes \text{Enc}_B(Z_i)^{-1}$;

computing $K' = 5PM(M_T \cdot \text{Enc}_B(M_{CSV})) \otimes \text{Enc}_B(Z_i)^{-1} = K_0 \otimes K_1$;

computing and transmitting $\text{Enc}_A(M_0, r_{M_0})$, $\text{Enc}_A(M_1, r_{M_1})$, $\text{Enc}_A(Z_0, r_{Z_0})$, and $\text{Enc}_A(Z_1, r_{Z_1})$ to P2, and transmitting $K_0$ and $K_1$ to P2;

selecting $u_0, u_1,$ and $v_1$ uniformly and independently at random from $Z_2^{n-m+1}$;

computing $Z^*v_0, Z^*v_1, (K'(*)v_0) \otimes \text{Enc}_B(u_0))$ and $(K'(*)v_1) \otimes \text{Enc}_B(u_1))$; and computing and transmitting $\text{Enc}_A(u_0, r_{u_0})$, $\text{Enc}_A(u_1, r_{u_1})$, $\text{Enc}_A(v_0, r_{v_0})$, $\text{Enc}_A(v_1, r_{v_1})$, $\text{Enc}_A(Z^*v_0, r_0)$ and $\text{Enc}_A(Z^*v_1, r_1)$ to P2 and transmitting $(K'(*)v_0) \otimes \text{Enc}_B(u_0))$ and $(K'(*)v_1) \otimes \text{Enc}_B(u_1))$ to P2.

10. The system as set forth in claim 7, wherein generating, by P2 and based on pattern p, a first binary value matrix $M_{CSV}$ and a corresponding first pair of encrypted permuted matrices, further comprises operations of:

constructing the first binary value matrix $M_{CSV}$ from pattern p;

selecting matrices $M_{CSV_0}$ and $M_{CSV_1}$ uniformly and independently at random from a set of $\mathbb{M}_{|\Sigma|+1,m}(\mathbb{Z}_2)$ restricted so that every column has exactly one 1 and remaining numbers in every column includes 0s;

selecting permutations $\pi_0, \pi_1$ from $S_{|\Sigma|+1}^m$, interpreted as an ordered m-tuple of permutations on columns, such computing $\pi_i(M_{CSV_i})$ and removing the last row equals $M_{CSV}$ for $i \in \{0,1\}$; and computing the first pair of encrypted permuted matrices as $\text{Enc}_B(M_{CSV_0}, r_{CSV_0})$ and $\text{Enc}_B(M_{CSV_1}, r_{CSV_1})$ and transmitting the first pair of encrypted permuted matrices to P1.

11. The system as set forth in claim 7, wherein applying, by P2 and based on the first random challenge bit, a permutation to one of the first pair of encrypted permuted matrices and transmitting encrypted results to P1, and generating a second random challenge bit, further comprises operations of:

computing encryption $\text{Enc}_B(M_{CSV})$ by first computing $$\pi_{1-b_1}(Enc_B(M_{CSV_{1-b_1}}, r_{CSV_{1-b_1}}))$$

and then removing a last row;
transmitting $$M_{CSV_{b_1}}, r_{CSV_{b_1}},$$

and $\pi_{1-b_1}$ to P1; and
selecting the second random challenge bit $b_2$ uniformly at random and transmitting $b_2$ to P1.

12. The system as set forth in claim 7, wherein verifying, by P2, that the encrypted permuted matrix corresponding to $M_T$ is correct and generating third and fourth random challenge bits, further comprises operations of:

using $$pk_A, M_{T_{b_2}}, \text{ and } r_{T_{b_2}},$$

checking that the encrypted permuted matrix corresponding to $M_T$, denoted as $$Enc_A(M_{T_{b_2}}, r_{T_{b_2}})$$

was correctly computed, such that if not, P2 aborts and declares P1 as a cheater, otherwise P2 continues;

computing $$Enc_A(M_T) = \gamma_{1-b_2}(Enc_A(M_{T_{1-b_2}}, r_{T_{1-b_2}}));$$

selecting the third random challenge bit $b_3$ uniformly and independently at random and sending $b_3$ to P1; and selecting the fourth random challenge $b_4$ uniformly and independently at random and sending $b_4$ to P1.

13. A computer program product for pattern matching between a first party P1 and a second party P2, the computer program product comprising:

a non-transitory computer-readable medium having executable instructions encoded thereon, such that upon execution of the instructions by one or more processors, the one or more processors perform operations of:
- generating, by P2 and based on pattern p, a first binary value matrix $M_{CSV}$ and a corresponding first pair of encrypted permuted matrices;
- generating, by P1, a first random challenge bit and, based on text T, generating a second binary value matrix ($M_T$) and a corresponding second pair of encrypted permuted matrices;
- applying, by P2 and based on the first random challenge bit as received from P1, a permutation to one of the first pair of encrypted permuted matrices and transmitting encrypted results to P1, and generating a second random challenge bit;
- verifying, by P1, that the encrypted results correspond to the first pair of encrypted permuted matrices, such that if not, P1 aborts and declares P2 as a cheater, otherwise P1 continues and generates an encryption of one of the second pair of encrypted permuted matrices corresponding to $M_T$ as generated by P1;
- verifying, by P2, that the encrypted permuted matrix corresponding to $M_T$ as received by P1 is correct such that if not, P2 aborts and declares P1 as a cheater, otherwise P2 continues by generating third and fourth random challenge bits;
- formatting, by P1 and based on the third and fourth random challenge bits, randomized decryptions for results of multiplying an encrypted matrix corresponding to pattern p and text T;
- verifying, by P2, that randomized decryptions as received from P1 are correctly formatted, such that if not, P2 aborts and declares P2 as a cheater, otherwise P2 continues; and
- determining, by P2, whether or not pattern p is within text T based on the randomized decryptions;
- initiating an access protocol if pattern p is within text T; and
- wherein in initiating the access protocol, one or more processors unlock a node in a network to grant access to the node to P2.

14. The computer program product as set forth in claim 13, wherein generating, by P1, the first random challenge bit and, based on text T, generating a second binary value matrix ($M_T$) and a corresponding second pair of encrypted permuted matrices, further comprises operations of:
- selecting the first random challenge bit $b_1$ uniformly and independently at random and sends $b_1$ to P2;
- constructing the second binary value matrix ($M_T$) from T;
- selecting matrices $M_{T_0}$ and $M_{T_1}$ uniformly and independently at random from a set of $\mathbb{M}_{n,|\Sigma|}(\mathbb{Z}_1)$ restricted so that every row has exactly one 1 and remaining numbers in every row includes 0s;
- selecting permutations $\gamma_0, \gamma_1$ from $S_{|\Sigma|}^n$, interpreted as an ordered n-tuple of permutations on rows, such that $\gamma_i(M_{T_i})=M_T$ for $i\in\{0,1\}$; and
- computing the second pair of encrypted permuted matrices $Enc_A(M_{T_0}, r_{T_0})$ and $Enc_A(M_{T_1}, r_{T_1})$ and transmitting the second pair of encrypted permuted matrices to P2.

15. The computer program product as set forth in claim 13, wherein verifying, by P1, that the encrypted results correspond to the first pair of encrypted permuted matrices and generating an encryption of one of the encrypted permuted matrices corresponding to $M_T$, further comprises operations of:

checking $$pk_B, M_{CSV_{b_1}}, \text{ and, } r_{CSV_{b_1}} \text{ that } Enc_B(M_{CSV_{b_1}}, r_{CSV_{b_1}})$$

was correctly computed, such that if not, P1 aborts and declares P2 as a cheater, otherwise continuing;

determining $Enc_B(M_{CSV})$ by first computing $$\pi_{1-b_1}(Enc_B(M_{CSV_{1-b_b}}, r_{CSV_{1-b_1}})$$

and then removing a last row;
setting $$Enc_A(M_T) = \gamma_{1-b_2}(Enc_A(M_{T_{1-b_2}}, r_{T_{1-b_2}}));$$

transmitting $$M_{T_{b_2}}, r_{T_{b_2}}, \gamma_{1-b_2}$$

to P2;
- selecting $M_0$ uniformly at random from $\mathbb{M}_{n,|\Sigma|}(\mathbb{Z}_2)$ and setting $M_1=M_T-M_0$;
- selecting $Z_0$ and $Z_1$ uniformly and independently at random from $Z_2^{n-m+1}$ and setting $Z=Z_0+Z_1$;
- for $i\in\{0,1\}$, computing $K_i=5PM(M_i \cdot Enc_B(M_{CSV}))\otimes Enc_B(Z_i)^{-1}$;
- computing $K'=5PM(M_T \cdot Enc_B(M_{CSV}))\otimes Enc_B(Z_i)^{-1}=K_0\otimes K_1$;
- computing and transmitting $Enc_A(M_0, r_{M_0})$, $Enc_A(M_1, r_{M_1})$, $Enc_A(Z_0, r_{Z_0})$, and $Enc_A(Z_1, r_{Z_1})$ to P2, and transmitting $K_0$ and $K_1$ to P2;
- selecting $u_0, u_1$, and $v_1$ uniformly and independently at random from $Z_2^{n-m+1}$;
- computing $Z^*v_0$, $Z^*v_1$, $(K'(*)v_0)\otimes Enc_B(u_0))$ and $(K'(*) v_1)\otimes Enc_B(u_1))$; and
- computing and transmitting $Enc_A(u_0, r_{u_0})$, $Enc_A(u_1, r_{u_1})$, $Enc_A(v_0, r_{v_0})$, $Enc_A(v_1, r_{v_1})$, $Enc_A(Z^*v_0, r_0)$ and $Enc_A(Z^*v_1, r_1)$ to P2 and transmitting $(K'(*)v_0)\otimes Enc_B(u_0))$ and $(K'(*)v_1)\otimes Enc_B(u_1))$ to P2.

16. The computer program product as set forth in claim 13, wherein generating, by P2 and based on pattern p, a first binary value matrix $M_{CSV}$ and a corresponding first pair of encrypted permuted matrices, further comprises operations of:
- constructing the first binary value matrix $M_{CSV}$ from pattern p;
- selecting matrices $M_{CSV_0}$ and $M_{CSV_1}$ uniformly and independently at random from a set of $\mathbb{M}_{|\Sigma|+1,m}(\mathbb{Z}_2)$ restricted so that every column has exactly one 1 and remaining numbers in every column includes 0s;
- selecting permutations $\pi_0, \pi_1$ from $S_{|\Sigma|+1}^m$, interpreted as an ordered m-tuple of permutations on columns, such that computing $\pi_i(M_{CSV_i})$ and removing the last row equals $M_{CSV}$ for $i\in\{0,1\}$; and
- computing the first pair of encrypted permuted matrices as $Enc_B(M_{CSV_0}, r_{CSV_0})$ and $Enc_B(M_{CSV_1}, r_{CSV_1})$ and transmitting the first pair of encrypted permuted matrices to P1.

17. The computer program product as set forth in claim 13, wherein applying, by P2 and based on the first random challenge bit, a permutation to one of the first pair of encrypted permuted matrices and transmitting encrypted results to P1, and generating a second random challenge bit, further comprises operations of:
computing encryption $Enc_B(M_{CSV})$ by first computing $$\pi_{1-b_1}(Enc_B(M_{CSV_{1-b_1}}, r_{CSV_{1-b_1}}))$$

and then removing a last row;
transmitting M $$M_{CSV_{b_1}}, r_{CSV_{b_1}},$$

and $\pi_{1-b_1}$ to P1; and
selecting the second random challenge bit $b_2$ uniformly at random and transmitting $b_2$ to P1.

18. The computer program product as set forth in claim 13, wherein verifying, by P2, that the encrypted permuted matrix corresponding to $M_T$ is correct and generating third and fourth random challenge bits, further comprises operations of:
using $$pk_A, M_{T_{b_2}}, \text{ and } r_{T_{b_2}},$$

checking that the encrypted permuted matrix corresponding to $M_T$, denoted as $$Enc_A(M_{T_{b_2}}, r_{T_{b_2}})$$

was correctly computed, such that if not, P2 aborts and declares P1 as a cheater, otherwise P2 continues;
computing $$Enc_A(M_T) = \gamma_{1-b_2}(Enc_A(M_{T_{1-b_2}}, r_{T_{1-b_2}}));$$

selecting the third random challenge bit $b_3$ uniformly and independently at random and sending $b_3$ to P1; and
selecting the fourth random challenge $b_4$ uniformly and independently at random and sending $b_4$ to P1.

19. A computer implemented method for pattern matching between a first system P1 and a second system P2, the method comprising operations of:
generating, by P2 and based on pattern p, a first binary value matrix $M_{CSV}$ and a corresponding first pair of encrypted permuted matrices;
generating, by P1, a first random challenge bit and, based on text T, generating a second binary value matrix ($M_T$) and a corresponding second pair of encrypted permuted matrices;
applying, by P2 and based on the first random challenge bit, a permutation to one of the first pair of encrypted permuted matrices and transmitting encrypted results to P1, and generating a second random challenge bit;
verifying, by P1, that the encrypted results correspond to the first pair of encrypted permuted matrices, such that if not, P1 aborts and declares P2 as a cheater, otherwise P1 continues and generates an encryption of one of the second pair of encrypted permuted matrices corresponding to $M_T$ as generated by P1;
verifying, by P2, that the encrypted permuted matrix corresponding to $M_T$ is correct such that if not, P2 aborts and declares P1 as a cheater, otherwise P2 continues by generating third and fourth random challenge bits;
formatting, by P1 and based on the third and fourth random challenge bits, randomized decryptions for results of multiplying an encrypted matrix corresponding to pattern p and text T;
verifying, by P2, that the randomized decryptions are correctly formatted, such that if not, P2 aborts and declares P2 as a cheater, otherwise P2 continues;
determining, by P2, whether or not pattern p is within text T based on the randomized decryptions; and
initiating an access protocol if pattern p is within text T; and
wherein in initiating the access protocol, one or more processors unlock a node in a network to grant access to the node to P2.

20. The computer implemented method as set forth in claim 19, wherein in initiating the access protocol, one or more processors unlock a node in a network to grant access to the node to P2;
wherein generating, by P2 and based on pattern p, a first binary value matrix $M_{CSV}$ and a corresponding first pair of encrypted permuted matrices, further comprises operations of:
constructing the first binary value matrix $M_{CSV}$ from pattern p;
selecting matrices $M_{CSV_0}$ and $M_{CSV_1}$ uniformly and independently at random from a set of $\mathbb{M}_{|\Sigma|+1,m}(\mathbb{Z}_2)$ restricted so that every column has exactly one 1 and remaining numbers in every column includes 0s;
selecting permutations $\pi_0, \pi_1$ from $S_{|\Sigma|+1}^m$, interpreted as an ordered m-tuple of permutations on columns, such computing $\pi_i(M_{CSV_i})$ and removing the last row equals $M_{CSV}$ for $i \in \{0,1\}$; and
computing the first pair of encrypted permuted matrices as $Enc_B(M_{CSV_0}, r_{CSV_0})$ and $Enc_B(M_{CSV_1}, r_{CSV_1})$ and transmitting the first pair of encrypted permuted matrices to P1.
wherein generating, by P1, the first random challenge bit and, based on text T, generating a second binary value matrix ($M_T$) and a corresponding second pair of encrypted permuted matrices, further comprises operations of:
selecting the first random challenge bit $b_1$ uniformly and independently at random and sends $b_1$ to P2;
constructing the second binary value matrix ($M_T$) from T;
selecting matrices $M_{T_0}$ and $M_{T_1}$ uniformly and independently at random from a set of $\mathbb{M}_{n,|\Sigma|}(\mathbb{Z}_2)$ restricted so that every row has exactly one 1 and remaining numbers in every row includes 0s;
selecting permutations $\gamma_0, \gamma_1$ from $S_{|\Sigma|}^n$, interpreted as an ordered n-tuple of permutations on rows, such that $\gamma_i(M_{T_i}) = M_T$ for $i \in \{0,1\}$; and
computing the second pair of encrypted permuted matrices $Enc_A(M_{T_0}, r_{T_0})$ and $Enc_A(M_{T_1}, r_{T_1})$ and transmitting the second pair of encrypted permuted matrices to P2;

wherein applying, by P2 and based on the first random challenge bit, a permutation to one of the first pair of encrypted permuted matrices and transmitting encrypted results to P1, and generating a second random challenge bit, further comprises operations of:
computing encryption $Enc_B(M_{CSV})$ by first computing $$\pi_{1-b_1}(Enc_B(M_{CSV_{1-b_1}}, r_{CSV_{1-b_1}}))$$

and then removing a last row;
transmitting $$M_{CSV_{b_1}}, r_{CSV_{b_1}}, \text{ and } \pi_{1-b_1}$$

to P1; and
selecting the second random challenge bit $b_2$ uniformly at random and transmitting $b_2$ to P1;
wherein verifying, by P1, that the encrypted results correspond to the first pair of encrypted permuted matrices and generating an encryption of one of the encrypted permuted matrices corresponding to $M_T$, further comprises operations of:
checking $$pk_B, M_{CSV_{b_1}}, \text{ and, } r_{CSV_{b_1}} \text{ that } Enc_B(M_{CSV_{b_1}}, r_{CSV_{b_1}})$$

was correctly computed, such that if not, P1 aborts and declares P2 as a cheater, otherwise continuing;
determining $Enc_B(M_{CSV})$ by first computing $$\pi_{1-b_1}(Enc_B(M_{CSV_{1-b_b}}, r_{CSV_{1-b_1}})$$

and then removing a last row;
setting $$Enc_A(M_T) = \gamma_{1-b_2}(Enc_A(M_{T_{1-b_2}}, r_{T_{1-b_2}}));$$

transmitting $$M_{T_{b_2}}, r_{T_{b_2}}, \gamma_{1-b_2}$$

to P2;
selecting $M_0$ uniformly at random from $\mathbb{M}_{n,|\Sigma|}(\mathbb{Z}_2)$ and setting $M_1 = M_T - M_0$;
selecting $Z_0$ and $Z_1$ uniformly and independently at random from $Z_2^{n-m+1}$ and setting $Z = Z_0 + Z_1$;
for $i \in \{0,1\}$, computing $K_i = 5PM(M_i \cdot Enc_B(M_{CSV})) \otimes Enc_B(Z_i)^{-1}$;
computing $K' = 5PM(M_T \cdot Enc_B(M_{CSV}))) \otimes Enc_B(Z_i)^{-1} = K_0 \otimes K_1$;
computing and transmitting $Enc_A(M_0, r_{M_0})$, $Enc_A(M_1, r_{M_1})$, $Enc_A(Z_0, r_{Z_0})$, and $Enc_A(Z_1, r_{Z_1})$ to P2, and transmitting $K_0$ and $K_1$ to P2;
selecting $u_0$, $u_1$, and $v_1$ uniformly and independently at random from $Z_2^{n-m+1}$;
computing $Z^*v_0$, $Z^*v_1$, $(K'(*)v_0) \otimes Enc_B(u_0))$ and $(K'(*)v_1) \otimes Enc_B(u_1))$; and
computing and transmitting $Enc_A(u_0, r_{u_0})$, $Enc_A(u_1, r_{u_1})$, $Enc_A(v_0, r_{v_0})$, $Enc_A(v_1, r_{v_1})$, $Enc_A(Z^*v_0, r_0)$ and $Enc_A(Z^*v_1, r_1)$ to P2 and transmitting $(K'(*)v_0) \otimes Enc_B(u_0))$ and $(K'(*)v_1) \otimes Enc_B(u_1))$ to P2;
wherein verifying, by P2, that the encrypted permuted matrix corresponding to $M_T$ is correct and generating third and fourth random challenge bits, further comprises operations of:
using $$pk_A, M_{T_{b_2}}, \text{ and } r_{T_{b_2}},$$

checking that the encrypted permuted matrix corresponding to $M_T$, denoted as $$Enc_A(M_{T_{b_2}}, r_{T_{b_2}})$$

was correctly computed, such that if not, P2 aborts and declares P1 as a cheater, otherwise P2 continues;
computing $$Enc_A(M_T) = \gamma_{1-b_2}(Enc_A(M_{T_{1-b_2}}, r_{T_{1-b_2}}));$$

selecting the third random challenge bit $b_3$ uniformly and independently at random and sending $b_3$ to P1; and
selecting the fourth random challenge $b_4$ uniformly and independently at random and sending $b_4$ to P1.

* * * * *